United States Patent
Hirose et al.

(10) Patent No.: US 11,235,417 B2
(45) Date of Patent: Feb. 1, 2022

(54) STRUCTURAL MEMBER

(71) Applicant: Nippon Steel Corporation, Tokyo (JP)

(72) Inventors: Satoshi Hirose, Tokyo (JP); Koichi Hamada, Tokyo (JP); Hiroki Fujimoto, Tokyo (JP); Tohru Okada, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 126 days.

(21) Appl. No.: 16/758,270

(22) PCT Filed: Oct. 31, 2017

(86) PCT No.: PCT/JP2017/039425
§ 371 (c)(1),
(2) Date: Apr. 22, 2020

(87) PCT Pub. No.: WO2019/087310
PCT Pub. Date: May 9, 2019

(65) Prior Publication Data
US 2020/0338661 A1   Oct. 29, 2020

(51) Int. Cl.
*B60J 7/00* (2006.01)
*B23K 11/11* (2006.01)
(Continued)

(52) U.S. Cl.
CPC ............ *B23K 11/11* (2013.01); *B23K 31/022* (2013.01); *B62D 25/145* (2013.01); *B62D 25/2036* (2013.01)

(58) Field of Classification Search
CPC ......... A01B 35/20; A01B 43/00; A01B 49/02; B67D 9/02; E01C 11/126; F16K 1/2265;
(Continued)

(56) References Cited

U.S. PATENT DOCUMENTS 10,195,684 B2 *   2/2019   Rottger ................. B23K 11/34
2005/0152741 A1 *   7/2005   Fujimoto ............... B23K 26/22
403/270

(Continued)

FOREIGN PATENT DOCUMENTS

JP   H04297376 A   10/1992
JP   H07125651 A   5/1995
(Continued)

OTHER PUBLICATIONS

English Abstract and Family List of JPH08337183.
(Continued)

*Primary Examiner* — Kiran B Patel
(74) *Attorney, Agent, or Firm* — Banner & Witcoff, Ltd.

(57) ABSTRACT

A structural member is provided that includes a steel sheet with a tensile strength of 980 MPa or higher overlying another metal plate and joined thereto by welding, where a break initiating near a welded portion is less likely to be produced. A structural member (10, 10a, 10b, 10c) includes: a first member (1), the first member being a steel sheet with a tensile strength of 980 MPa or higher; a second member (2) overlying the first plate (1), the second member being a metal plate; a plurality of welded portions (3, 31, 32); a plurality of heat-affected zones (5, 51, 52) each formed to surround the corresponding one of the welded portions (3, 31, 32), the heat-affected zones having a Vickers hardness lower than that of the first member by 50 HV or more. A pair of edge sections (4) of the first member (1) are provided between adjacent heat-affected zones (5, 51, 52). The pair of edge sections (4) of the first member located between the adjacent heat-affected zones (5, 51, 52) extend to cross a line (LC1) linking the adjacent welded portions (3, 31, 32).

11 Claims, 34 Drawing Sheets

(51) Int. Cl.
*B23K 31/02* (2006.01)
*B62D 25/14* (2006.01)
*B62D 25/20* (2006.01)

(58) Field of Classification Search
CPC ..... H01R 13/53; H01R 13/567; A61F 5/0111; A61F 5/0118
See application file for complete search history.

(56) References Cited

U.S. PATENT DOCUMENTS

| | | | | |
|---|---|---|---|---|
| 2014/0147693 | A1* | 5/2014 | Yasuyama | B62D 21/157 |
| | | | | 428/594 |
| 2015/0174702 | A1* | 6/2015 | Fujimoto | B23K 26/244 |
| | | | | 428/594 |
| 2016/0084802 | A1* | 3/2016 | Yusuf | G01N 29/045 |
| | | | | 73/582 |
| 2017/0011730 | A1* | 1/2017 | Seto | B60R 13/0838 |
| 2018/0236589 | A1* | 8/2018 | Furusako | B23K 26/32 |
| 2018/0251160 | A1* | 9/2018 | Hamada | B60J 5/0443 |
| 2019/0076963 | A1* | 3/2019 | Hara | B23K 26/0869 |
| 2020/0086815 | A1* | 3/2020 | Koga | B60R 19/18 |
| 2020/0223494 | A1* | 7/2020 | Hisada | B62D 27/023 |
| 2020/0290149 | A1* | 9/2020 | Fujimoto | B62D 21/09 |
| 2021/0147002 | A1* | 5/2021 | Ito | B62D 21/15 |
| 2021/0205915 | A1* | 7/2021 | Zeniya | B23K 11/11 |
| 2021/0205925 | A1* | 7/2021 | Hara | C22C 38/02 |

FOREIGN PATENT DOCUMENTS

| | | |
|---|---|---|
| JP | H07172344 A | 7/1995 |
| JP | H0872644 A | 3/1996 |
| JP | H08337183 A | 12/1996 |
| JP | 2006142905 A | 6/2006 |
| JP | 2009279597 A | 12/2009 |
| JP | 2010064549 A | 3/2010 |
| JP | 2012219886 A | 11/2012 |
| JP | 2015003552 A | 1/2015 |

OTHER PUBLICATIONS

English Abstract and Family List of JP2006142905A.
English Abstract and Family List of JPH0872644A.
English Abstract and Family List of JP2010064549A.
English Abstract and Family List of JPH07125651A.
English Abstract and Family List of JPH04297376A.
English Abstract and Family List of JP2015003552A.
English Abstract and Family List of JP2009279597A.
English Abstract and Family List of JPH07172344A.
English Abstract and Family List of JP2012219886A.

* cited by examiner

STRUCTURAL MEMBER

RELATED APPLICATION DATA

This application is a National Stage Application under 35 U.S.C. 371 of co-pending PCT application number PCT/JP2017/039425 designating the United States and filed Oct. 31, 2017 which is hereby incorporated by reference in its entirety.

TECHNICAL FIELD

The present invention relates to a structural member including plates that overlie each other and are joined together.

BACKGROUND ART

A structural member is used that includes a plurality of plates overlying each other and joined together. For example, JP Hei8(1996)-337183 A (Patent Document 1) describes a strength member including two thin plates facing each other and arranged in the left-right direction and coupled together to form a closed cross section. Flanges for coupling the plates together extend from the tops and bottoms of the two thin plates. The flanges of the two thin plates abut each other and are coupled by spot welding.

JP 2006-142905 A (Patent Document 2) describes an energy-absorbing member. The energy-absorbing member includes a hat member and a closing plate that is plate-shaped and closes the opening of the hat member. The hat member and closing plate are joined to each other by spot welding.

PRIOR ART DOCUMENTS

Patent Documents

Patent Document 1: JP Hei8(1996)-337183 A
Patent Document 2: JP 2006-142905 A

SUMMARY OF THE INVENTION

Problems to be Solved by the Invention

These conventional techniques do not take account of the strength of the welded portions of the plates overlying each other obtained by spot welding. If the overlying plates are high-strength steel sheets with a tensile strength of 980 MPa or higher, heat-affected zones may be produced around the welded portions, softened by heat during welding. These heat-affected zones may present weak points in the structural member. For example, when an automobile crashes into another automobile at one of its B-pillars and this B-pillar deforms, a longitudinal tensile stress is generated in the B-pillar. At this moment, a heat-affected zone in the flanges may be broken by the tensile stress.

In view of this, present application discloses a structural member including a steel sheet with a tensile strength of 980 MPa or higher overlying another metal plate and joined thereto by welding, where a break initiating near a welded portion is less likely to be produced.

Means for Solving the Problems

A structural member according to an embodiment of the present invention includes: a first member, the first member being a steel sheet with a tensile strength (ultimate tensile strength) of 980 MPa or higher; a second member overlying the first plate, the second member being a metal plate; a plurality of welded portions joining the first member and the second member by welding; a plurality of heat-affected zones formed in the first member, each of the heat-affected zones surrounding a corresponding one of the plurality of welded portions, the heat-affected zones having a Vickers hardness lower than that of the first member by 50 HV or more; and a pair of edge sections of the first member located between adjacent heat-affected zones and extending in a direction crossing a line linking the adjacent welded portions.

Effects of the Invention

An embodiment of the present invention provides a structural member including a steel sheet with a tensile strength of 980 MPa or higher overlying another metal plate and joined thereto by welding, where a break initiating near a welded portion is less likely to be produced.

EMBODIMENTS FOR CARRYING OUT THE INVENTION

Figure 1A:
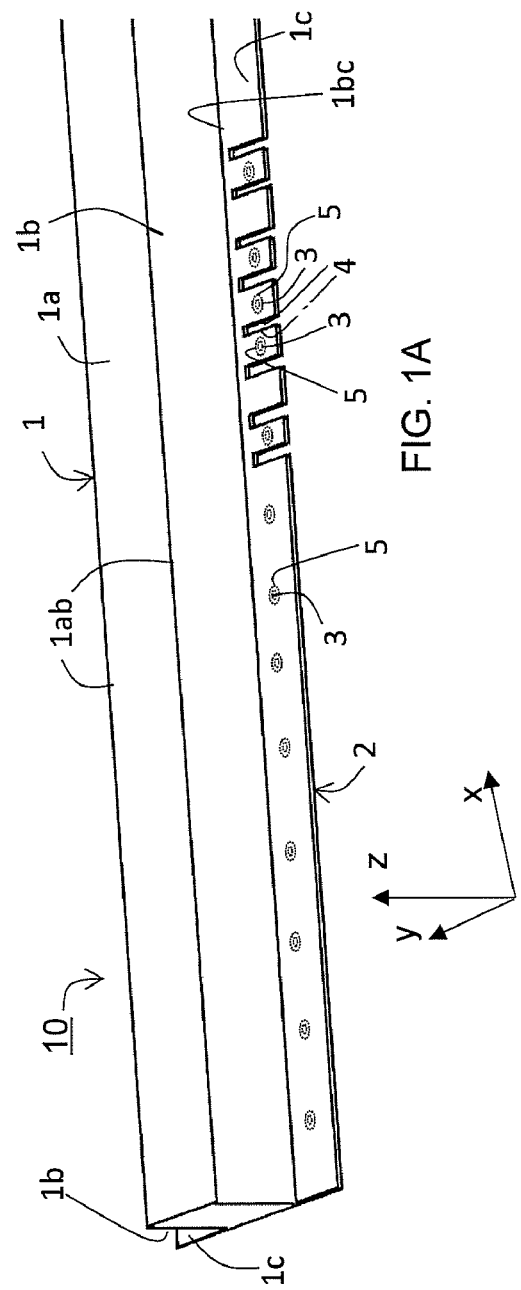
FIG. 1A is a perspective view of a structural member according to the present embodiment.

Welding is typically used to join a first member, which is a steel sheet, and an overlying second member, which is a metal sheet. The inventors investigated the deformation behavior of a structural member including a first member and a second member joined together. When a force is applied to the structural member in a direction perpendicular to the plate surfaces of the first and second members, the structural member deforms and bends. For increased tensile strengths of the material of the first member, the inventors found that, when the structure deforms, portions of the first and second members near the welded portions joining them by welding can easily break.

The inventors came up with the following explanation of this phenomenon: During welding, heat is applied to a position on the first and second members at which they are joined by welding, i.e. welded portion. Portions surrounding the welded portion are also affected by the heat during welding. If welding is performed on a steel sheet with a tensile strength of 980 MPa or higher, portions surrounding the welded portion is softened by the heat during welding. A steel material with a tensile strength of 980 MPa or higher contains hard phases to achieve high tensile strength. The heat during welding changes the nature of these hard phases, leading to softening. Specifically, martensite is transformed to ferrite. When tensile stresses in the in-plane direction increase to a certain level, the first or second member breaks, where portions surrounding the welded portion that have been softened by the heat during welding present an initiation points.

Based on this explanation, the inventors attempted to find an arrangement that prevents softened portions produced around the welded portion from being broken by tensile stresses in the in-plane direction. The inventors conducted various and numerous analyses and experiments and arrived at the idea of cutting portions between softened portions around welded portions of a steel sheet with a tensile strength of 980 MPa or higher. That is, they arrived at the idea of providing a pair of edge sections between softened portions around adjacent welded portions of a steel sheet with a tensile strength of 980 MPa or higher. In this way, they found that, when tensile stresses in the in-plane direction increase, a break originating from an initiation point presented by portions around a welded portion may be prevented. Based on these findings, they arrived at the embodiments described below.

(Arrangement 1)

A structural member according to Arrangement 1 of an embodiment of the present invention includes: a first member, the first member being a steel sheet with a tensile strength of 980 MPa or higher; a second member overlying the first plate, the second member being a metal sheet; a plurality of welded portions joining the first member and the second member by welding; a plurality of heat-affected zones formed in the first member, each of the heat-affected zones surrounding a corresponding one of the plurality of welded portions, the heat-affected zones having a Vickers hardness lower than that of the first member by 50 HV or more; and a pair of edge sections of the first member located between adjacent heat-affected zones and extending in a direction crossing a line linking the adjacent welded portions.

In the structural member of Arrangement 1, around each of a plurality of welded portions of a first member with a tensile strength of 980 MPa or higher is formed a heat-affected zone with a Vickers hardness lower than the hardness of the first member by 50 HV or more. A portion between adjacent heat-affected zones is cut. That is, a pair of edge sections of the first member are provided between adjacent heat-affected zones of the first member. The pair of edge sections extend to cross the line linking the welded portions inside the adjacent heat-affected zones. That is, the edge sections extend to cross the line linking the adjacent welded portions. In this arrangement, when the structural member receives a force in a direction perpendicular to the plate surface of the first member and deforms, tensile stresses in in-plane directions of the first member acting on the heat-affected zone may be mitigated. Thus, when the structural member deforms, a break originating from the initiation point represented by a heat-affected zone may be less likely to occur. That is, in a structural member obtained by placing a steel sheet with a tensile strength of 980 MPa or higher over another metal sheet and joining them together by welding, a break originating from the initiation point represented by a portion near a welded portion may be less likely to occur.

(Arrangement 2)

Starting from the structural member of Arrangement 1, it is preferable that the pair of edge sections cross a line linking centers of the adjacent welded portions. This makes it easier to produce the effect of mitigating tensile stresses acting on the heat-affected zones. The center of a welded portion is defined as the midpoint of a line segment extending in one direction and dividing the welded portion into two equal sections as viewed in a direction perpendicular to the plate surface of the first member. As used herein, plate surface of the first member means the surface of the first member that is in contact with the second member, i.e. contact surface for the second member.

(Arrangement 3)

Starting from the structural member of Arrangement 2, it is preferable that the pair of edge sections cross an edge of an area defined between inner peripheries of the adjacent heat-affected zones. This makes it yet easier to produce the effect of mitigating tensile stresses acting on the heat-affected zones.

(Arrangement 4)

Starting from the structural member of Arrangement 2 or 3, it is preferable that the pair of edge sections traverse an area defined between the adjacent heat-affected zones. This makes it still easier to produce the effect of mitigating tensile stresses acting on the heat-affected zones.

(Arrangement 5)

Starting from the structural member of any one of Arrangements 1 to 4, it is preferable that the pair of edge sections be an edge of a hole formed in the first member. This is because a certain strength of the first member can more easily be provided if the edge sections of the first member between adjacent heat-affected zones are constituted by the edge of a hole than if the edge sections are cuts.

(Arrangement 6)

Starting from the structural member of any one of Arrangements 1 to 5, it is preferable that the second member have a tensile strength lower than 1180 MPa and no edge section be provided for the second member between the adjacent welded portions. It is more preferable that the tensile strength of the second member be lower than 980 MPa. It is yet more preferable that the tensile strength of the second member be lower than 800 MPa. It is still more preferable that the tensile strength of the second member be lower than 720 MPa. Such a low tensile strength of the second member prevents portions around the welded portions from being softened by heat from welding relative to the hardness of the second member. Preventing softening of portions around the welded portions of the second member makes it less likely that a break near a welded portion occurs due to increased tensile stresses in in-plane directions. Thus, even in arrangements where a pair of edge sections of the second member are not provided between adjacent heat-affected zones, a break near a welded portion is less likely to occur. Further, as no edge sections are provided between the adjacent welded portions of the second member, a certain strength of the structural member can easily be provided.

(Arrangement 7)

Starting from the structural member of any one of Arrangements 1 to 6, it is desirable that the second member be a steel sheet with a tensile strength of 980 MPa or higher. It is more desirable that the second member be a steel sheet of tensile strength of 1180 MPa or higher. This increases the strength of the member. However, in such implementations, a softened heat-affected zone may also be produced near a welded portion of the second member. To address this, a pair of edge sections of the second member may be provided between adjacent welded portions to prevent a break originating from an initiation point near a welded portion.

(Arrangement 8)

Starting from the structural member of any one of Arrangements 1 to 6, it is preferable that, in the second member and around the plurality of welded portions, no heat-affected zones with a Vickers hardness lower than that of the second member by 50 HV or more be provided. If no heat-affected zones are present around the welded portions of the second member, a break near a welded portion due to increased tensile stresses in in-plane directions are less likely to occur. Thus, a break near a welded portion may be less likely to occur even in arrangements where a pair of edge sections of the second member are not provided between adjacent heat-affected zones.

(Arrangement 9)

Starting from the structural member of any one of Arrangements 1 to 8, it is preferable that a distance between those ones of the edge sections sandwiching the welded portions which are closer to each of the welded portions be six times a diameter of the welded portions or smaller. In other words, the plurality of welded portions may include a first welded portion created by spot welding, a second welded portion adjacent to the first welded portion, and a third welded portion adjacent to the second welded portion. It is preferable that, as viewed in a direction perpendicular to the plate surface of the first member, the sum of the distance from the second welded portion to the closest position on that edge section of the first member which is located between the second and first welded portions and the distance from the second welded portion to the closest position on that edge section of the first member which is located between the second and third welded portions be six times the diameter of the first welded portion or smaller.

In Arrangement 9, burdens on the first welded portion occurring when the structural member is deformed by a force in a direction perpendicular to the plate surface of the first member may be reduced. Further, deformation concentration on the first welded portion can be prevented.

(Arrangement 10)

Starting from the structural member of any one of Arrangements 1 to 9, it is preferable that a radius of curvature of an edge section linking the pair of edge sections be 10 mm or smaller. In other words, it is preferable that, as viewed in a direction perpendicular to the plate surface of the first member, the radius of curvature of a corner of a cut or hole in the first member formed by the pair of edge sections of the first member between the adjacent heat-affected zones be 10 mm or smaller. This prevents deformation concentration in the first and second members occurring when the structural member deforms due to a force in a direction perpendicular to the plate surface of the first member.

(Arrangement 11)

In the structural member of any one of Arrangements 1 to 10, it is preferable that the first member include a ridge, and the pair of edge sections and an edge section connecting to the pair of edge sections do not interrupt the ridge. That is, it is preferable that the edge section of the first member formed between the pair of edge sections of the first member between adjacent heat-affected zones be positioned not to reach the ridge. As none of the edge sections of the first member interrupts the ridge, the strength of the structural member may be increased over arrangements where one or more of the edge sections of the first member interrupt(s) the ridge.

For example, at least one of the first and second members may include a bent portion that is bent in an out-of-plane direction. In such implementations, the bent portion constitutes the ridge. The plurality of welded portions may be arranged in the direction in which the ridge extends, for example. It is desirable that the edge section between the pair of edge sections of the first member between adjacent heat-affected zones do not extend all the way to the ridge. This is because, if the ridge is interrupted, the member can easily be bent sharply at that position.

In the structural member of any one of Arrangements 1 to 11, the first member and the second member may form a closed cross section. The portion of the member having a closed cross section thus formed will be referred to as closed-cross-section portion. That is, at least two portions of the first member of which the plate surfaces are separated from each other may be in contact with the second member. In such implementations, the portion of the first member that is located between the two portions that are in contact with the second member is separated from the second member. The overlying portions of the first and second members are joined by welding. The overlying and joined portions of the first and second members form flanges located inward or outward with respect to the closed-cross-section portion. The flanges extend in the axial direction of the closed-cross-section portion. For example, the first member may be a hat member and the second member may be a closing plate. The first member may be a hat member such that the strength of the member can be ensured by the ridge. While the plate surface is susceptible to out-of-plane deformation, the ridge cannot easily deform. If the ridge is made of a high-strength material, a member with high strength will result.

The structural member of any one of Arrangements 1 to 11 may include a closed-cross-section portion including at least one plate forming a closed cross section. The plate forming a closed cross section includes the first member and the second member. In such implementations, each of the first and second members is part of the plate forming a closed cross section. The first and second members are placed over each other and then joined by welding. The overlying portions of the first and second members may form flanges located inward or outward with respect to the closed-cross-section portion. Alternatively, the overlying portions of the first and second members may form part of the closed-cross-section portion.

In the structural member of any one of Arrangements 1 to 11, the metal microstructure of the first member has martensite as its main phase. To provide a steel sheet with a tensile strength of 980 MPa or higher, the main phase must be martensite. That is, the area fraction of martensite in the first member is 25% or higher. The area fraction of martensite in the first member may be 100%. It is desirable that the metal microstructure of the second member have ferrite as its main phase. That is, the area fraction of the ferrite phase in the second member may be 30% or higher. An upper limit for the area fraction of ferrite in the second member may be 95%. Alternatively, the area fraction of martensite in the second member may be 70% or lower. This prevents a softened heat-affected zone from developing in the portions of the second member that surround a welded portion.

Embodiments

Figure 1B:
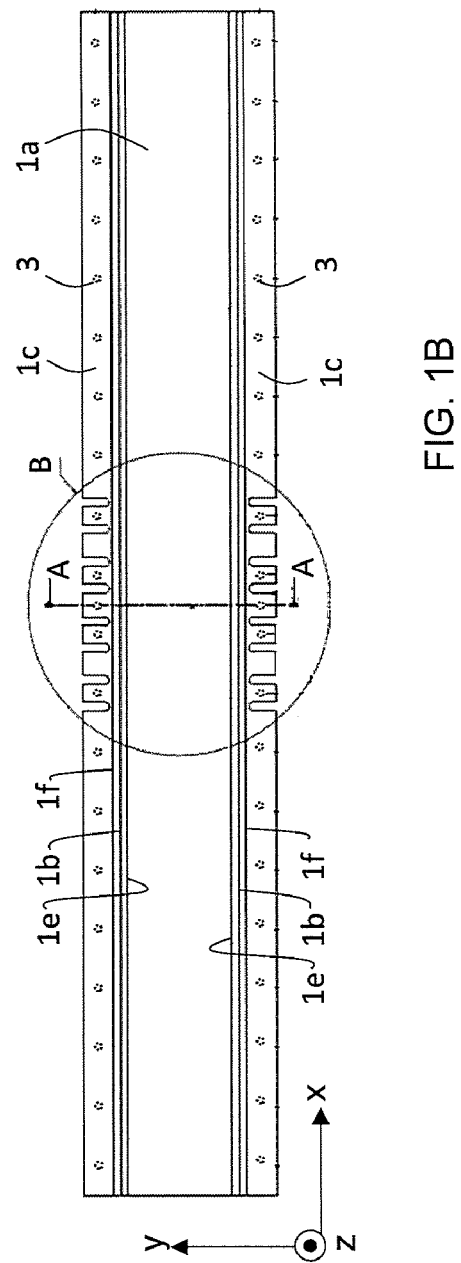
FIG. 1B is a plan view of the structural member of FIG. 1A as viewed in the z-direction.
Figure 1C:
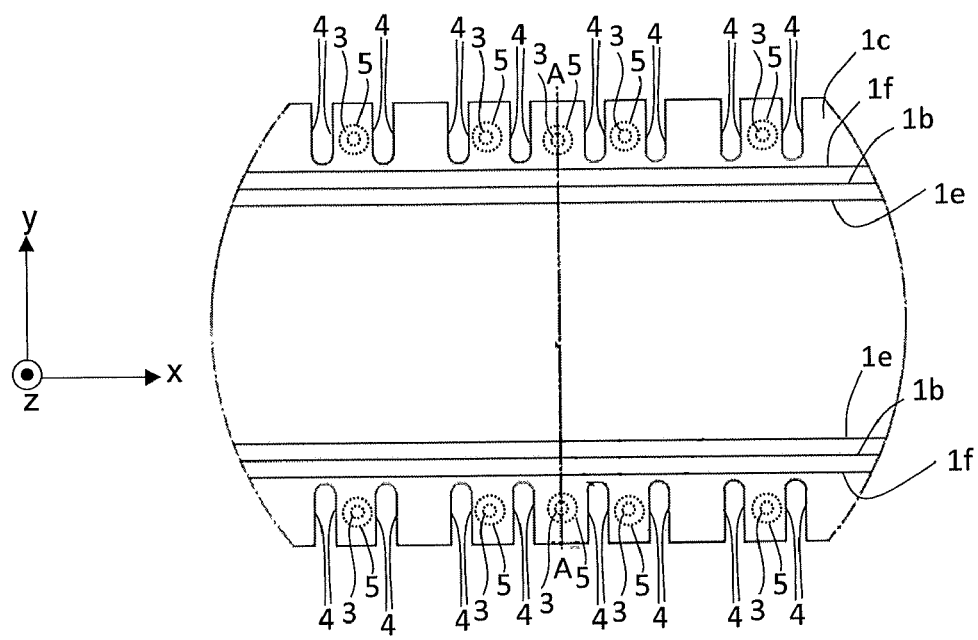
FIG. 1C is an enlarged view of the portion defined by circle B of FIG. 1B.
Figure 1D:
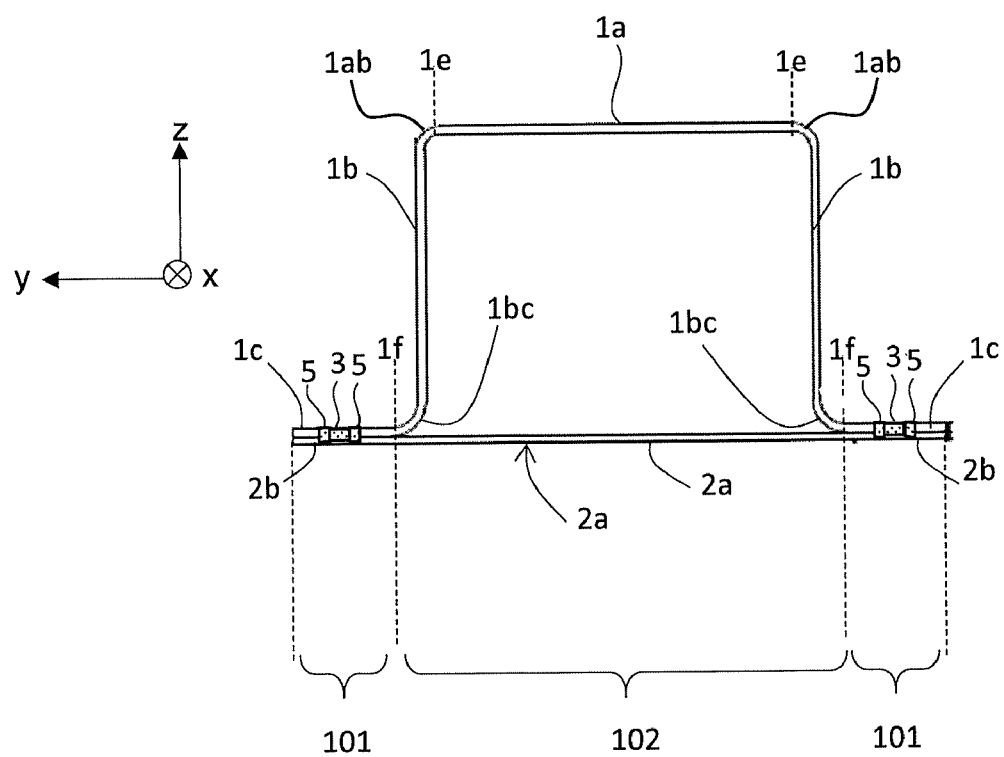
FIG. 1D is a cross-sectional view taken along line A-A of FIG. 1C.

FIG. 1A is a perspective view of a structural member 10 according to the present invention embodiment. FIG. 1B is a plan view of the structural member 10 of FIG. 1A as viewed in a direction perpendicular to the longitudinal direction (i.e., in the z-direction). FIG. 1C is an enlarged view of the portion defined by circle B of FIG. 1B. FIG. 1D is a cross-sectional view taken along line A-A of FIGS. 1B and 1C.

The structural member 10 is constructed by combining a steel sheet and a metal sheet (which may not be a steel sheet). One of these plates is a hat member 1 and the other one is a closing plate 2. The hat member 1 has a hat-shaped cross section. The hat member 1 has flanges that overlie portions of the closing plate 2 and are joined thereto. The hat member 1 is an example of the first member. The closing plate 2 is an example of the second member.

As shown in FIG. 1A, the hat member 1 includes a top-surface portion 1a, side walls 1b and flanges 1c. The side walls 1b extend from the respective edges of the top-surface portion 1a and face each other. Each side wall 1b has one end adjacent to the top-surface portion 1a and the other end opposite to the one end. The flanges 1c are contiguous to the respective side walls 1b and extend away from each other, each from the other end of the associated side wall 1b. That is, each of the two flanges 1c extends from the other end of the associated side wall 1b outwardly as determined along the direction in which the side walls 1b, which face each other, are arranged. The closing plate 2 is joined to the flanges 1c.

The portion of the member forming the border between the top-surface portion 1a and a side wall 1b (i.e., shoulder) forms a bent portion of the hat member 1 (i.e., first bent portion 1ab). The first bent portion 1ab forms a ridge extending in the longitudinal direction of the structural member 10 (i.e., x-direction). The portion of the member forming the border between each of the side walls 1b and the associated flange 1c forms a second bent portion 1bc of the hat member 1. The second bent portion 1bc also forms a ridge extending in the x-direction.

The flanges 1c and closing plate 2 are placed so as to overlie each other, and are joined together. In the present implementation, the flanges 1c and the closing plate 2 are joined by spot welding. In FIGS. 1A to 1C, the positions of the welded portions 3, at which the flanges 1c are joined to the closing plate 2 by welding, are indicated by dotted lines. As shown in FIG. 1D, the portions of the flanges 1c and closing plate 2 that are in one piece as a result of welding constitute the welded portions 3.

The hat member 1 is made from a steel sheet with a tensile strength of 980 MPa or higher. The hat member 1 is obtained by molding a metal sheet. The closing plate 2 is made of metal. The closing plate 2 is not limited to a particular tensile strength.

As shown in FIG. 1D, the flanges 1c overlie the closing plate 2 at two positions. Each flange 1c and the closing plate 2 overlying each other form a plate coupling 101. The plate coupling 101 exemplifies the overlying and joined plate portions. That is, the portion 2b of the closing plate 2 that is in contact with the flange 1c and the flange 1c are placed over each other and are joined by welded portions 3 to provide a plate coupling 101. The plate coupling 101 serves as a flange of the structural member 10. In FIG. 1D, two plate couplings 101 are present. Between these plate couplings 101 is provided a closed-cross-section portion 102 formed by the portions of the hat member 1 and closing plate 2 that extend in a separated manner. That is, the hat member 1 and closing plate 2 form a closed-cross-section portion 102. The closed-cross-section portion 102 is constructed from the side walls 1b and top-surface portion 1a of the hat member 1 and that portion 2a of the closing plate 2 which is located between the portions 2b that are in contact with the flanges 1c. That is, the closed-cross-section portion 102 is formed by plates surrounding an empty space.

Thus, the structural member 10 includes a closed-cross-section portion 102 formed by plates surrounding an empty space and flanges contiguous to the closed-cross-section portion 102 and located outward with respect to the closed-cross-section portion 102 (i.e., plate couplings 101). The closed-cross-section portion 102 forms a pipe. The portions of the flanges 1c and closing plate 2 that are joined together (i.e., plate couplings 101) provide flanges protruding from the pipe.

In the implementation shown in FIGS. 1A to 1D, the axial direction of the pipe formed by the closed-cross-section portion 102 is represented by the x-direction. The plate couplings 101, i.e., flanges of the structural member 10, extend in the x-direction. In this implementation, the direction of extension of the pipe formed by the closed-cross-section portion 102 (i.e., longitudinal direction) is the same as the direction of the extension of the flanges of the structural member 10. Alternatively, the direction of extension of the flanges of the structural member 10 may not be the same as the direction of extension of the pipe formed by the closed-cross-section portion 102. For example, it is possible to combine hat members with side walls 1b each having a height that varies along the longitudinal direction.

As shown in FIG. 1C, each flange 1c and closing plate 2 are joined by a plurality of welded portions 3, i.e., a plurality of spot welds. A heat-affected zone 5 is present around each of the welded portions 3 of the flange 1c. A heat-affected zone 5 is a portion of the member that has softened due to heat during welding for a welded portion 3. The heat-affected zones 5 are softer than the surrounding portions. Heat-affected zone 5 is defined as a portion with a Vickers hardness lower than that of the hat member 1 i.e. base material by 50 HV or more. That is, the Vickers hardness of a heat-affected zone 5 is lower than the Vickers hardness of the portions surrounding the heat-affected zone 5 by 50 HV or more.

In the closing plate 2, the welded portions 3 may or may not be surrounded by heat-affected zones. If the closing plate 2 has heat-affected zones with decreased tensile strengths, a pair of edge sections of the closing plate are also provided between adjacent heat-affected zones of the closing plate 2. In FIG. 1B, the heat-affected zones are not shown.

As shown in FIG. 1C, as viewed in a direction perpendicular to the surface of a flange 1c in contact with the closing plate 2 (i.e., in the z-direction), pairs of edge sections 4 of the flange 1c are provided, each pair between the adjacent heat-affected zones 5 formed around adjacent ones of the welded portions 3. A pair of edge sections 4 of the flange 1c between adjacent heat-affected zones 5 extend to cross the line linking the adjacent welded portions 3.

In the implementation shown in FIG. 1C, the presence of a pair of edge sections 4 of a flange 1c between adjacent heat-affected zones 5 results in a gap between the adjacent heat-affected zones 5. The pair of edge sections 4 may be in contact with each other. The presence of a pair of edge sections 4 between adjacent heat-affected zones 5 results in a discontinuity between the adjacent heat-affected zones 5. Further, if the closing plate 2 also has heat-affected zones 5 with decreased tensile strengths, a pair of edge sections of the closing plate 2 are provided between adjacent heat-affected zones 5. In such implementations, a pair of edge sections of a flange 1c between adjacent heat-affected zones 5 and a pair of edge sections of the closing plate 2 between the associated adjacent welded portions may be positioned to partially overlap or may not be positioned to overlap as viewed in the z-direction.

The welded portions 3 are arranged in the x-direction, i.e., direction in which the ridges formed by the first and second bent portions 1ab and 1bc extend. The flange 1c is interrupted at positions between adjacent heat-affected zones 5 by the discontinuities formed by the pairs of edge sections 4.

The pair of edge sections 4 between adjacent heat-affected zones 5 prevent forces acting on the flange 1c from being transmitted between the adjacent heat-affected zones 5. For example, when the structural member 10 receives an external force and deforms, a single welded portion 3 and its surrounding heat-affected zone 5 experience forces that cause the flange 1c to deform. A pair of edge sections 4 of the flange 1c, i.e., discontinuity, is present between that particular heat-affected zone 5 and an adjacent heat-affected zone 5. This discontinuity prevents forces acting on that single heat-affected zone 5 from being transmitted to the adjacent heat-affected zone 5. This allows adjacent heat-affected zones 5 to deform without restraining each other. This leads to a reduced load on each heat-affected zone 5, making a break less likely at the heat-affected zone 5.

As shown in FIG. 1D, the first bent portions 1ab and second bent portions 1bc of the hat member 1 have round and curved shapes, and the surfaces of the first and second bent portions 1ab and 1bc include curved surfaces. That is, a round portion (or curved portion) is formed in each of the first and second bent portions 1ab and 1bc. In FIGS. 1C and 1D, that end of the round (or curved) portion of a first bent portion 1ab which is closer to the top-surface portion 1a represents a round-portion border (or round-portion end) 1e, while that end of the round (or curved) portion of a second bent portion 1bc which is closer to the associated flange 1c represents a round-portion border (or round-portion end) 1f). The ridge of the first bent portion 1ab extends in the same direction as the round-portion border 1e (i.e., x-direction). The ridge of the second bent portion 1bc extends in the same direction as the round-portion border 1f (i.e., x-direction). A round-portion border is the border between a bent portion and a surface adjacent to the bent portion. The position at which the surface orientation changes as it goes toward the bent portion from the adjacent surface is regarded as a round-portion border.

As shown in FIG. 1C, as viewed in the z-direction (i.e. direction perpendicular to the joined surfaces), a pair of edge sections 4 of a flange 1c between adjacent heat-affected zones 5 form part of a cut (or slit) toward the interior (i.e., toward the side wall 1b) from the edge of the flange 1c. The cut in the flange 1c does not extend all the way to the side wall 1b. More specifically, the edge section connecting the pair of edge sections 4 of the flange 1c between adjacent heat-affected zones 5 does not extend all the way to the second bent portion 1bc, which represents the border between the flange 1c and side wall 1b (see also FIG. 1D). In other words, the edge section connecting the pair of edge sections 4 of the flange 1c between adjacent heat-affected zones 5 does not extend all the way to the ridge formed between the closed-cross-section portion 102 and the flange of the structural member 10. As a specific example, the pair of edge sections 4 of the flange 1c between adjacent heat-affected zones 5 and the edge section of the flange 1c connecting the pair of edge sections 4 are located further in the direction of the flange 1c than the round-portion border if of the second bent portion 1bc closer to the flange 1c. That is, as viewed in the z-direction (i.e. direction perpendicular to the joined surfaces), the edge section connecting the pair of edge sections 4 of the flange 1c between adjacent heat-affected zones 5 is positioned not to intersect the second bent portion 1bc. This is intended to prevent the member from being easily bent at a position at which the ridge is disrupted. The edge section connecting the pair of edge sections between adjacent welded portions 3 of the closing plate 2 may or may not intersect the second bent portion 1bc as viewed in the z-direction.

<Examples of Heat-Affected Zones>

Figure 2:
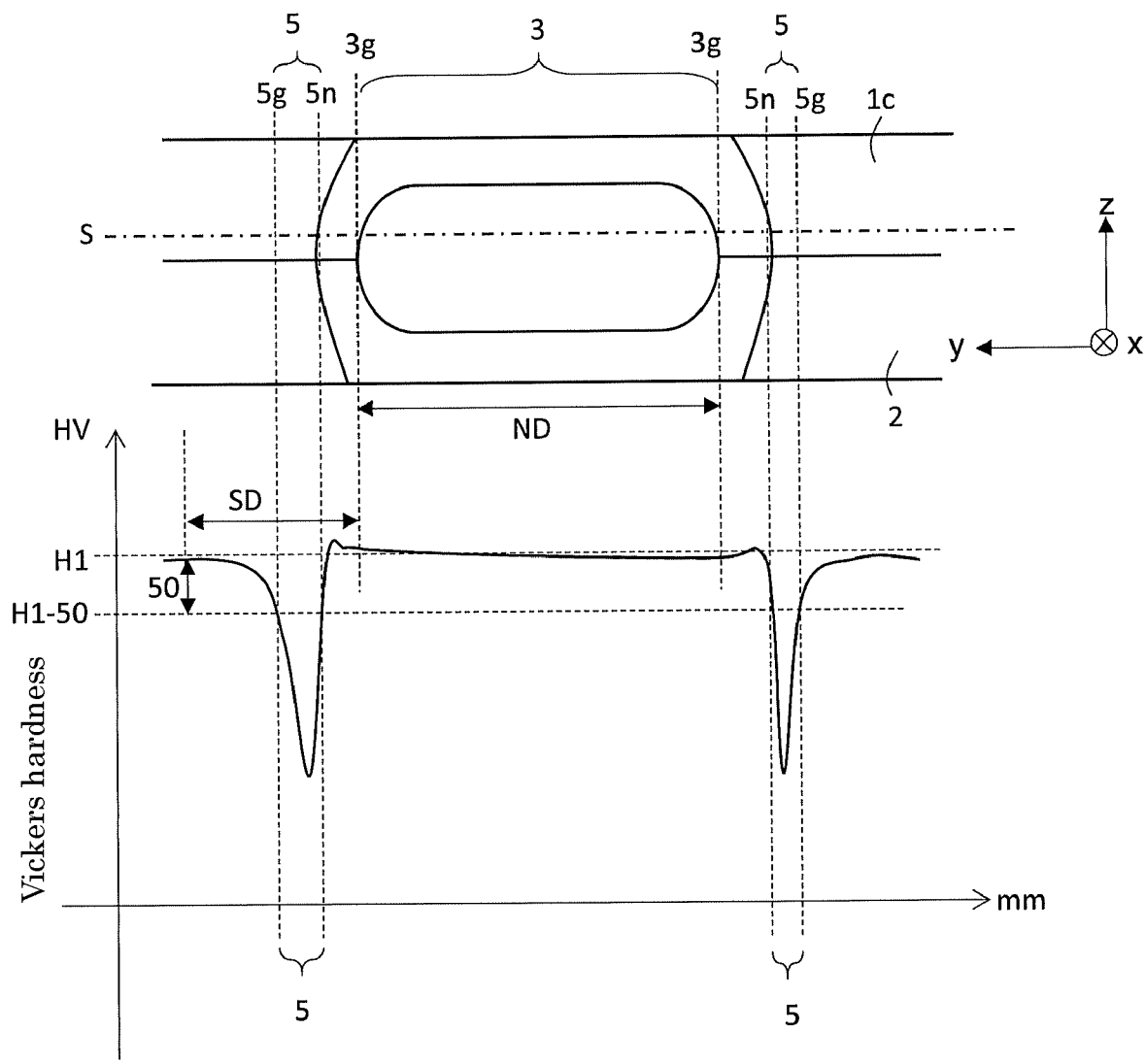
FIG. 2 shows an exemplary cross-sectional structure of a welded portion and its heat-affected zone and the associated hardness distribution.

FIG. 2 shows an exemplary cross-sectional structure of a welded portion 3 and its heat-affected zone 5 and the associated hardness distribution. The upper half of FIG. 2 shows a cross-sectional view of a portion of the structural member that includes the welded portion 3 and heat-affected zone 5. The lower half of FIG. 2 shows a graph of Vickers-hardness distribution taken along line S in the cross-sectional view. In FIG. 2, the first and second members are made of the same material. During welding, the welded portion 3 is heated until it melts, and is then cooled. In the welded portion 3, heat is removed by the electrode, leading to a very high cooling rate. As a result, the welded portion 3 is quenched. As a result of the quenching, the welded portion 3 and heat-affected portions adjacent to the welded portion 3 have hardnesses substantially equal to that of the first member. Around the welded portion 3 and spaced apart therefrom are heat-affected portions where the strengthened microstructure of the first member has changed its nature due to the heating during welding and has softened. These softened heat-affected portions result from a low cooling rate. The portions around the welded portion 3 that have softened shown in FIG. 2 will be specifically referred to as heat-affected zone 5. The hardness of the first member 1 as measured at a distance of SD=10 mm or larger from the welded portion 3 will be hereinafter regarded as the hardness of the first member. The same applies to the second member. A heat-affected zone 5 of the first member is represented by portions with Vickers hardnesses lower than the hardness of the first member by 50 HV or more. The hardness of the first member as measured at a distance of SD or larger from the welded portion 3 is the same as the hardness of the first member. The distance SD varies depending on the material and plate thickness of the first member. If the first member is a steel sheet for automobile applications with plate thicknesses of about 1 to 2 mm, SD is deemed to be 10 mm. The same applies if heat-affected zones develop in the second member. That is, a heat-affected zone of the second member is represented by portions with Vickers hardnesses lower than the hardness of the second member by 50 HV or more. The hardness of the second member at a distance of SD or larger from the welded portion 3 is the same as the hardness of the second member.

<Examples of Arrangements of Pair of Edge Sections>

Figure 3:
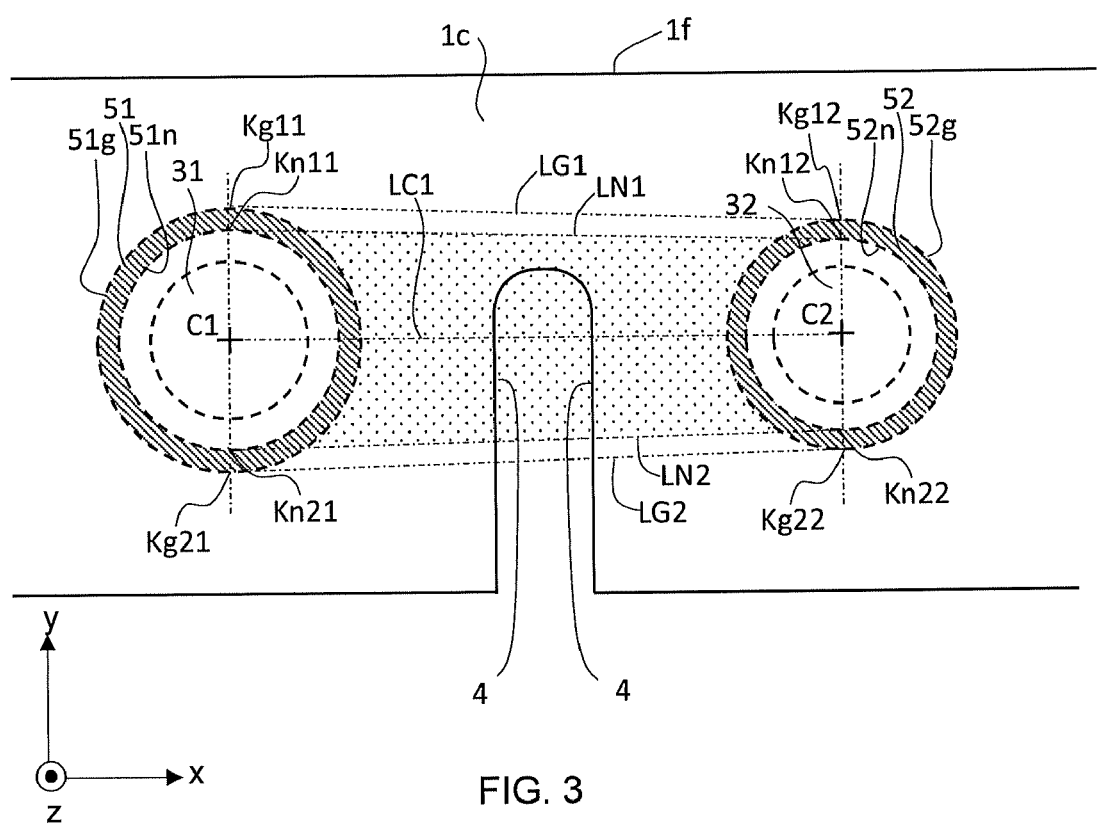
FIG. 3 illustrates an exemplary arrangement of edge sections between heat-affected zones.

FIG. 3 illustrates an exemplary arrangement of a pair of edge sections 4 of the flange 1c between adjacent heat-affected zones 5 of the flange 1c. FIG. 3 is a view in the direction perpendicular to the surface of the flange 1c that is in contact with the closing plate 2 (i.e., z-direction). As shown in FIG. 3, in the present embodiment, two edge sections 4 of the flange 1c are positioned between adjacent heat-affected zones 51 and 52 to extend in a direction crossing line LC1 linking the centers C1 and C2 of adjacent welded portions 31 and 32 as viewed in the z-direction.

As used herein, "between adjacent heat-affected zones" means an area defined between an outer periphery 51g of the heat-affected zone 51 and an outer periphery 52g of the adjacent heat-affected zone 52. In the implementation of FIG. 3, the area surrounded by the outer peripheries 51g and 52g of the heat-affected zones 51, line LG1 and line LG2.

Direction crossing line LC1 linking the centers C1 and C2 of the adjacent welded portions 31 and 32 means a direction angled from this line LC1. It is not limited to the direction perpendicular to line LC1. Further, the pair of edge sections 4 of the flange 1c may or may not intersect line LC1 linking the centers of adjacent welded portions.

It is preferable that, as shown in FIG. 3, the pair of edge sections 4 of the flange 1c between the adjacent heat-affected zones 51 and 52 cross line LC1 linking the centers C1 and C2 of the adjacent welded portions 31 and 32 as viewed in the z-direction. The width of each of the heat-affected zones 51 and 52 as measured in the direction of line LC1 is at its minimum at the overlap between line LC1 and the heat-affected zone 51, 52. That is, loads can most easily be concentrated on portions of the heat-affected zones 51 and 52 along line LC1. Accordingly, as line LC1 linking the centers C1 and C2 of adjacent welded portions 31 and 32 intersects the pair of edge sections 4 of the flange 1c, loads on the heat-affected zones 51 and 52 during deformation of the flange 1c can be effectively reduced.

Further, in the implementation shown in FIG. 3, the pair of edge sections 4 of the flange 1c between the heat-affected zones 51 and 52 cross lines LC1 and LN2. Lines LN1 and LN2 are represented by edges of the area defined between an inner periphery 51n of the heat-affected zone 51 and an inner periphery 52n of the adjacent heat-affected zone 52. It is preferable that the pair of edge sections 4 of the flange 1c between these heat-affected zones 51 and 52 cross line LC1 and at least one of these two lines LN1 and LN2. This effectively reduces loads on the heat-affected zones 51 and 52 during deformation of the flange 1c.

Figure 4:
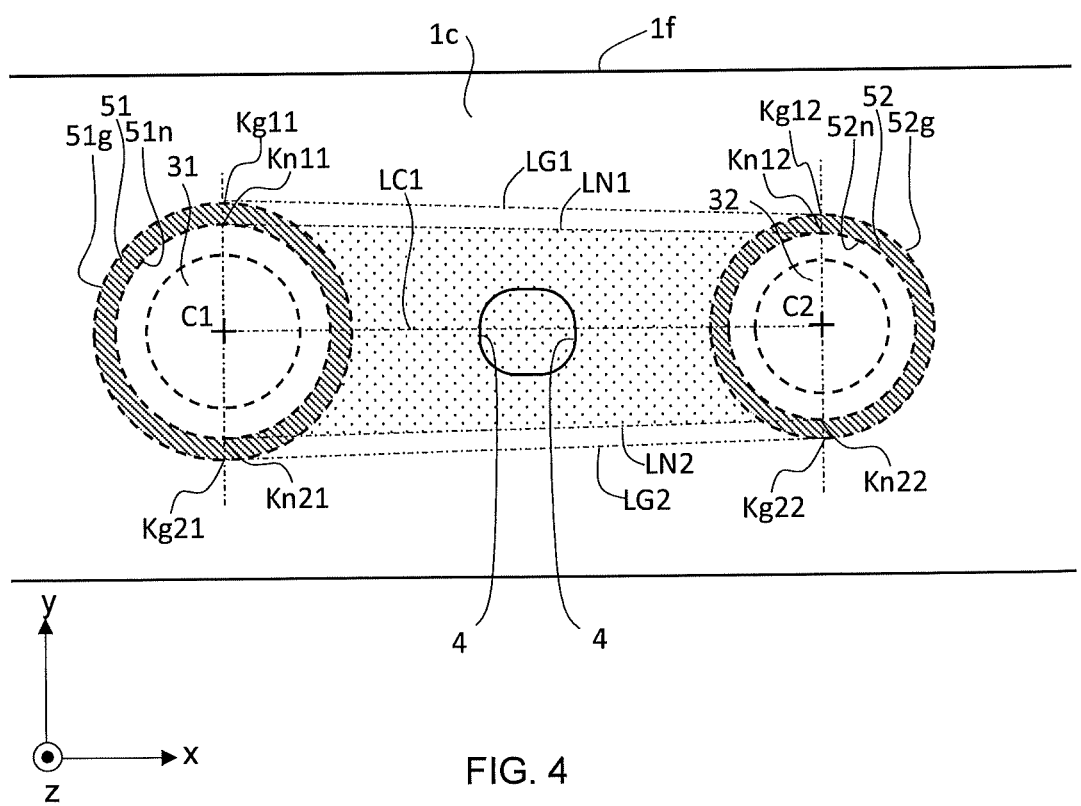
FIG. 4 illustrates another exemplary arrangement of edge sections between heat-affected zones.

Alternatively, the pair of edge sections 4 of the flange 1c between the heat-affected zones 51 and 52 may cross line LC1 linking the centers C1 and C2 of the welded portions 31 and 32 and may not cross the two lines LN1 and LN2. In the implementation shown in FIG. 4, the pair of edge sections 4 of the flange 1c between the heat-affected zones 51 and 52 cross line LC1 and do not cross either of the two lines LN1 and LN2. The pair of edge sections 4 of the flange 1c are portions of the edge of a hole formed in the flange 1c.

Further, the pair of edge sections 4 of the flange 1c between the heat-affected zones 51 and 52 may cross line LC1 linking the centers C1 and C2 of the welded portions 31 and 32 and also cross the two lines LN1 and LN2. In the implementation shown in FIG. 5, the pair of edge sections 4 of the flange 1c between the heat-affected zones 51 and 52 cross line LC1 and also cross the two lines LN1 and LN2.

Figure 5:
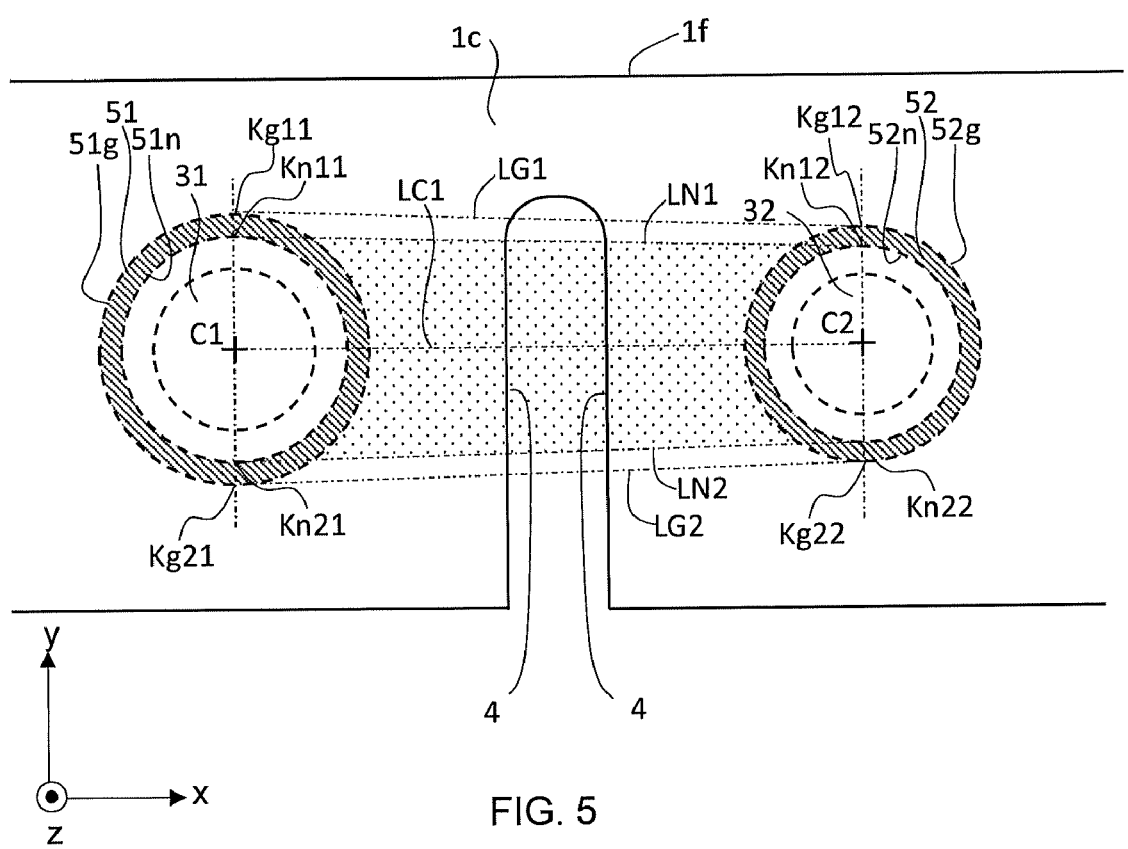
FIG. 5 illustrates yet another exemplary arrangement of edge sections between heat-affected zones.

In the implementation shown in FIG. 5, the pair of edge sections 4 of the flange 1c between the heat-affected zones 51 and 52 cross the two lines LG1 and LG2. Lines LG1 and LG2 are edges of the area defined between the outer periphery 51g of the heat-affected zone 51 and the outer periphery 52g of the adjacent heat-affected zone 52. In such implementations, the pair of edge sections 4 of the flange 1c between the heat-affected zones 51 and 52 traverse the area defined between the adjacent heat-affected zones 51 and 52. This effectively reduces loads on the heat-affected zones 51 and 52 during deformation of the flange 1c.

<Variation of Second Member>

Figure 6:
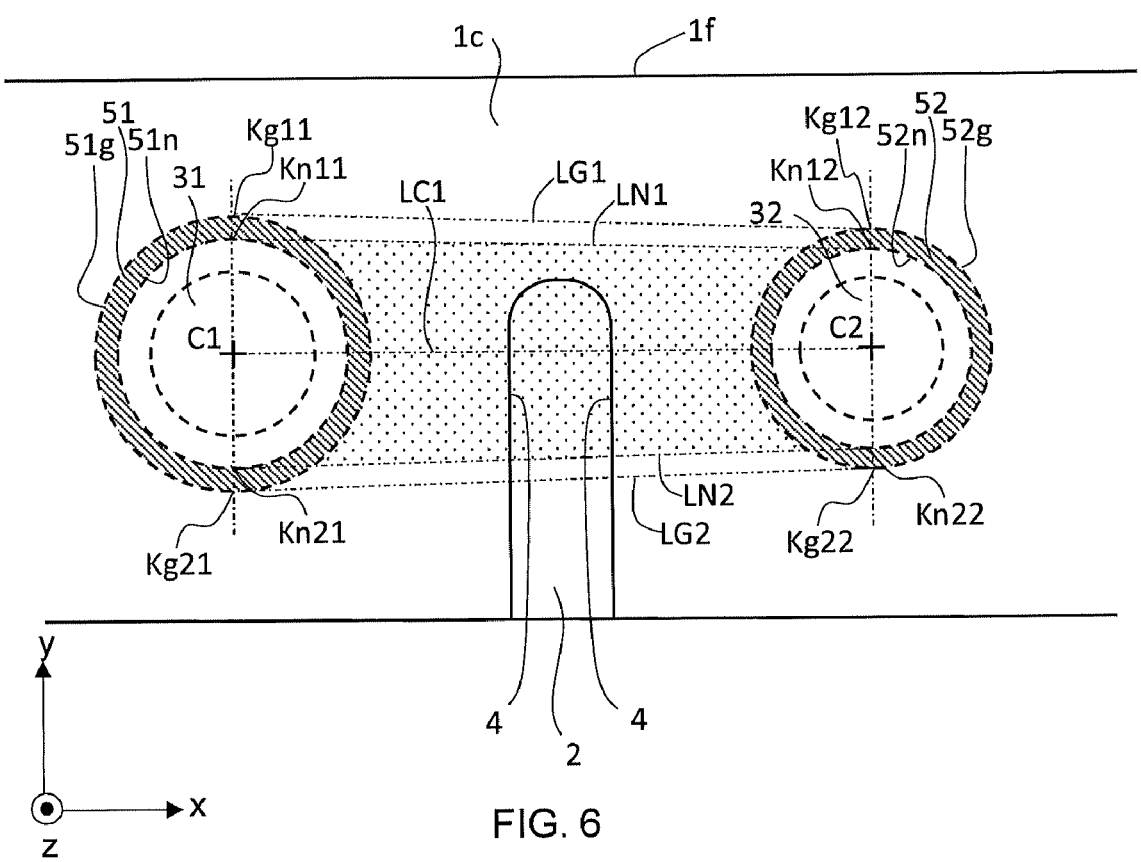
FIG. 6 illustrates a variation of the second member.

FIG. 6 illustrates a variation of the closing plate 2, which is an example of the second member. If the closing plate has no heat-affected zones with decreased tensile strengths, no edge sections of the closing plate 2 need to be provided between adjacent welded portions 31 and 32, as shown in FIG. 6. Such arrangements also reduce loads on the heat-affected zones 51 and 52 during deformation of the flange 1c. It is preferable that the tensile strength of the material of the closing plate 2 be lower than 980 MPa. This is because, as a result, portions around the welded portions 3 can less easily be softened by heat during welding. Thus, it is preferable to select, as the material of the closing plate 2, a material that does not develop a softened portion due to heat during welding. That is, it is preferable that the closing plate 2 have no heat-affected zones around the welded portions 3. This is because, if there are no heat-affected zones with lower tensile strengths, a break originating from an initiation point represented by a heat-affected zone does not occur during deformation of the closing plate 2.

As discussed above, the hat member 1 is made of a high-strength material with a tensile strength of 980 MPa or higher. In view of this, for the hat member 1, a pair of edge sections of a flange 1c are provided between the heat-affected zones 51 and 52 of the flange 1c. On the contrary, the closing plate 2 is made of a material that does not develop heat-affected zones. For the closing plate 2, no edge sections are provided between the welded portions 3. Thus, a high-strength material may be used for the hat member 1 to ensure that the structural member 10 has a sufficient strength. Further, a break originating from a softened portion developed due to the use of a high-strength material is prevented.

Figure 7:
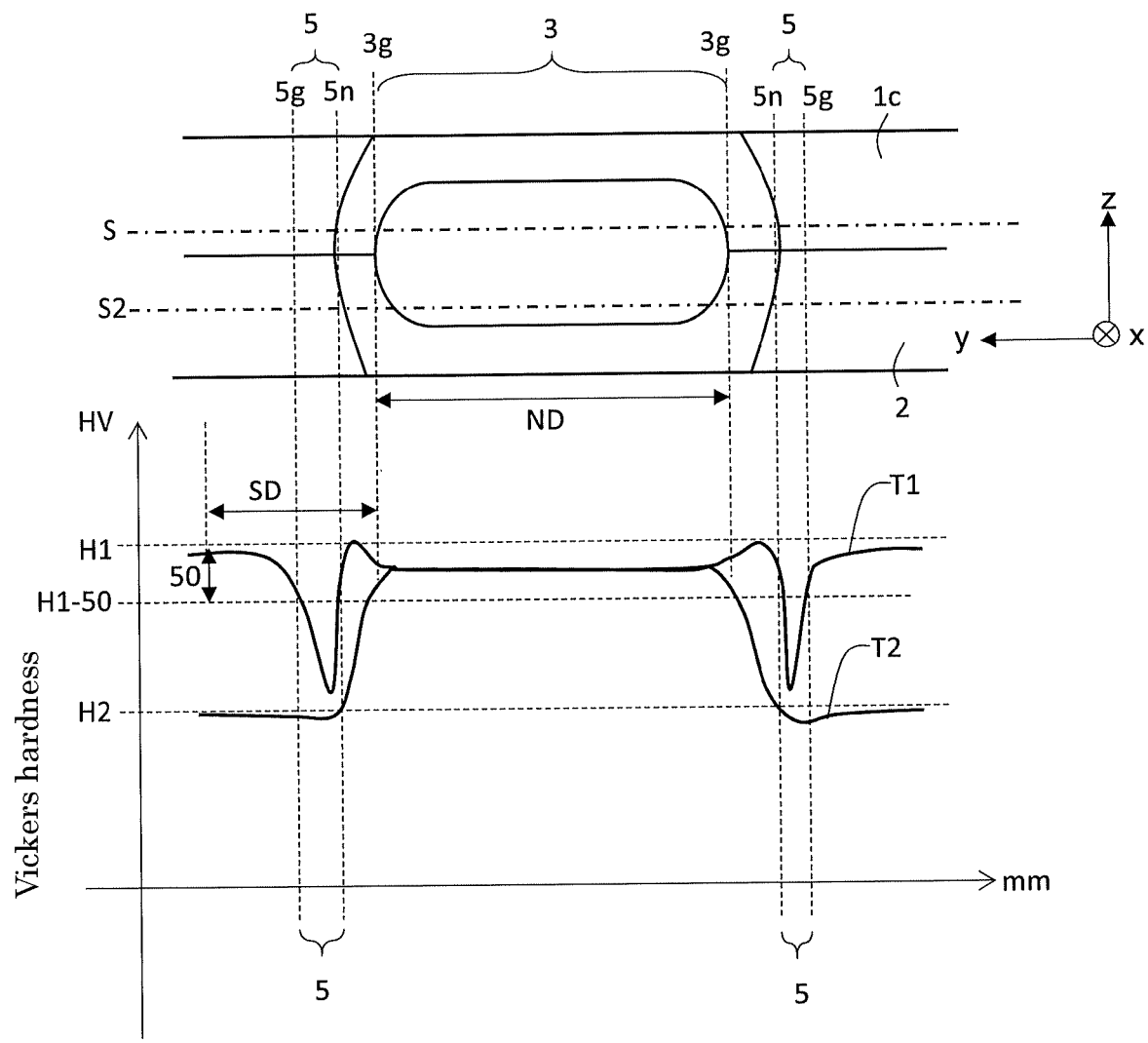
FIG. 7 shows a cross-sectional structure of the variation shown in FIG. 6 and the associated hardness distribution.

FIG. 7 shows an exemplary cross section of portions of a closing plate 2 near a welded portion and a Vickers-hardness distribution, where the closing plate has a tensile strength lower than 1180 MPa. In FIG. 7, the upper half of FIG. 7 shows a cross-sectional view of a plate portion including the welded portion 3. The lower half of FIG. 7 shows a graph of Vickers-hardness distribution taken along lines S and S2 in the cross-sectional view. In this graph, line T1 indicates the Vickers-hardness distribution along line S, while line T2 indicates the Vickers-hardness distribution along line S2.

As shown in FIG. 7, the tensile strength of the welded portion 3 is lower than the hardness of the hat member 1. This is because, at the welded portion 3, materials of the hat member 1 and closing plate 2 melt and are mixed together, resulting in a composition having a hardness lower than the hat member 1. The areas of the hat member 1 that are adjacent to the welded portion 3 and have been affected by the heat have a hardness substantially equal to that of the hat member 1 (base material). Areas of the hat member 1 that are spaced apart from the welded portion 3 and have been affected by the heat have a decreased hardness compared with the hat member 1. The hardness distribution in the heat-affected zones 5 of the hat member 1 is the same as in FIG. 2. The hardness of the welded portion 3 of the closing plate 2 is substantially equal to the hardness of the hat member 1. The hardness of the portions of the closing plate 2 around the welded portion 3 that have been affected by the heat decreases as it goes away from the welded portion 3. This is because the cooling rate after welding decreases as it goes away from the welded portion 3. The cooling rate in areas near the welded portion 3 is high because of the heat removal by the electrode for spot welding. The closing plate 2 has no heat-affected zones with hardnesses lower than that of the closing plate 2 by 50 HV or more.

<Variations of First and Second Members>

Figure 8A:
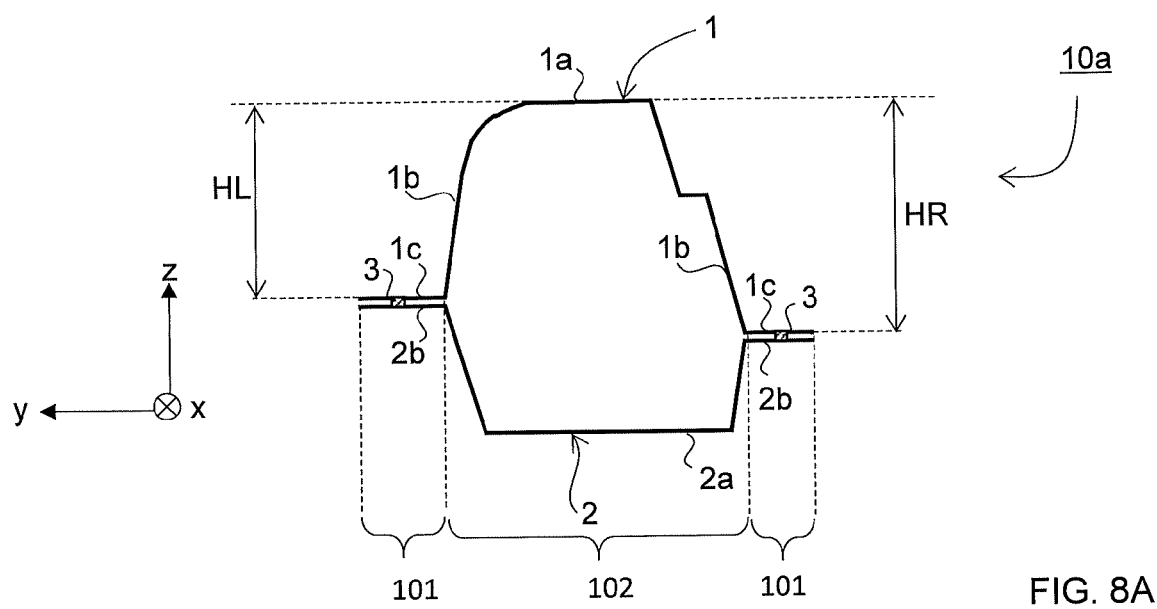
FIG. 8A is a cross-sectional view of a variation of the structural member with another cross-sectional shape.

FIG. 8A is a cross-sectional view of a variation of the structural member with another cross-sectional shape. The cross-sectional shape of the structural member 10*a* shown in FIG. 1D is left-right symmetry with respect to the perpendicular bisector of the closing plate 2 (i.e., plane containing the x-axis). On the contrary, the structural member 10*a* shown in FIG. 8A is left-right asymmetrical with respect to the perpendicular bisector of the closing plate 2. The hat member 1 of the structural member 10*a* shown in FIG. 8A has two side walls 1*b* with different shapes. The two side walls 1*b* have different angles relative to the flanges 1*c* and different heights HR and HL in the z-direction.

In the implementation shown in FIG. 8A, one of the two side walls 1*b* has a stepped portion. The other one of the two side walls 1*b* is round and curved in shape. Specifically, a round portion is formed at a position on the other side wall 1*b* that roughly corresponds to the first bent portion 1*ab*.

Although not shown, at least one of the top-surface portion 1*a*, side walls 1*b*, flanges 1*c* and closing plate 2 may have a curved surface, rather than a flat surface. That is, at least one of the top-surface portion 1*a*, side walls 1*b*, flanges 1*c* and closing plate 2 may be curved.

In FIG. 8A, the heat-affected zones are not shown. In FIGS. 9A to 14 (except for FIG. 11B), the heat-affected zones are not shown, either.

Further, in the implementation shown in FIG. 8A, the closing plate 2 is shaped to protrude away from the hat member 1. Specifically, the closing plate 2 includes portions 2*b* overlying the flanges 1*c* of the hat member 1 and a portion 2*a* between these portions 2*b*. The portion 2*a* is shaped to protrude away from the hat member 1. In this implementation, the closing plate 2 has a hat-shaped cross section. This results in a so-called double-hat-shaped structural member. In the arrangement shown in FIG. 8A, the hat member 1 may constitute the first member and the closing plate 2 may constitute the second member; alternatively, the hat member 1 may constitute the second member and the closing plate 2 may constitute the first member.

Figure 8B:
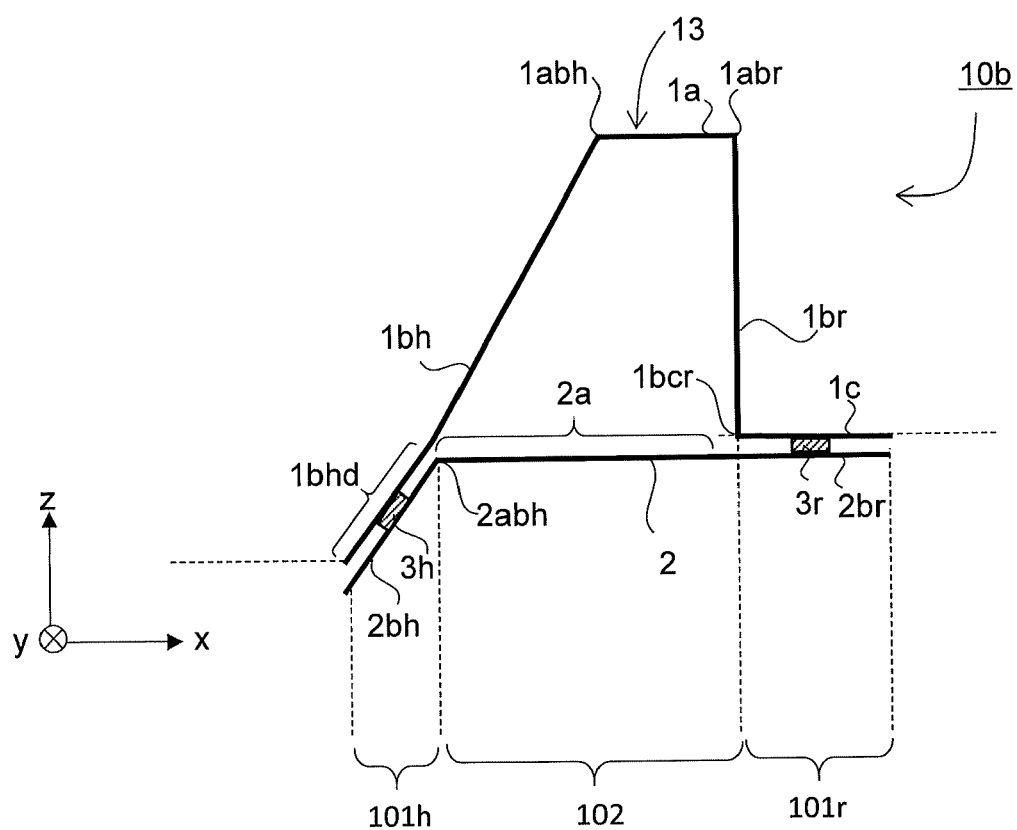
FIG. 8B is a cross-sectional view of a variation of the structural member with yet another cross-sectional shape.

FIG. 8B is a cross-sectional view of another variation of the structural member with a different cross-sectional shape. The implementation shown in FIG. 8B uses a groove-shaped member including a single flange instead of a hat member having two flanges. The structural member 10*b* shown in FIG. 8B includes a groove-shaped grooved member 13, a closing plate 2, and welded portions 3*r* and 3*h* that join the grooved member 13 with the closing plate 2. The grooved member 13 includes a top-surface portion 1*a* and a first side wall 1*br* and a second side wall 1*bh* extending from the respective ends of the top-surface portion 1*a*. The first and second side walls 1*br* and 1*bh* face each other.

The flange 1*c* extends outwardly from that end of the first side wall 1*b* which is opposite to that on the top-surface portion 1*a*. A bent portion 1*bcr* is on the border between the first side wall 1*br* and flange 1*c*. The flange 1*c* is placed over the closing plate 2 and is joined thereto at welded portions 3*r*. The closing plate 2 overlies a portion, 1*bhd*, of the second side wall 1*bh* that includes its end opposite to the end on the top-surface portion 1*a*. The portion 1*bhd* and closing plate 2 are joined at welded portions 3*h*. The closing plate 2 includes a bent portion 2*abh* at the inner end of the portion 2*bh* overlying the second side wall 1*bh*.

The grooved member 13 may not include a flange. In the arrangement shown in FIG. 8B, the grooved member is an example of the first member and the closing plate 2 is an example of the second member. The structural member 10*b* includes a closed-cross-section portion 102 and flanges 101*r* and 101*h* positioned outward of the closed-cross-section portion 102. The welded portions 3*r* and 3*h* are formed in the flanges 101*r* and 101*h*. The grooved member 13 has heat-affected zones (not shown) around the welded portions 3*r* and 3*h*.

Figure 8C:
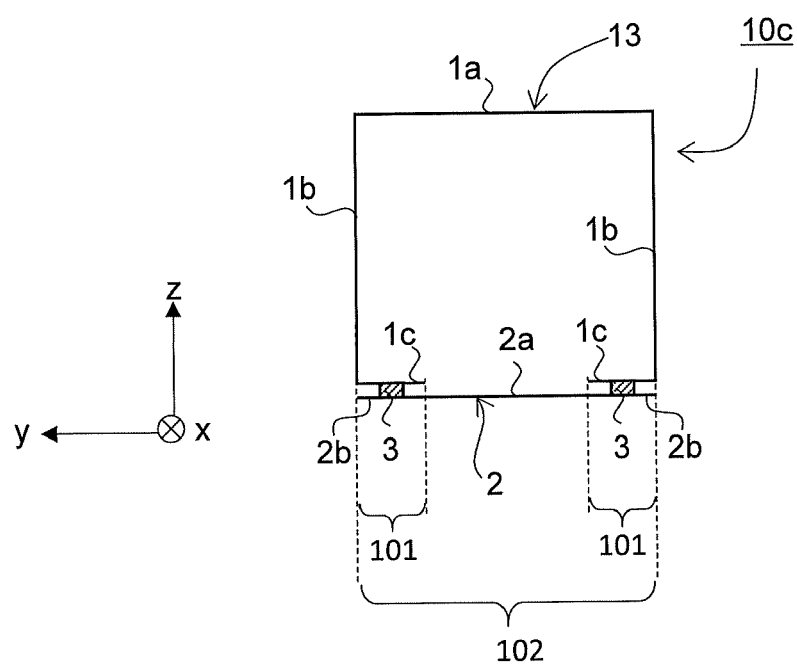
FIG. 8C is a cross-sectional view of a variation of the structural member with still another cross-sectional shape.

Alternatively, as shown in FIG. 8C, the flanges 101 in which the welded portions 3 are formed may be located inward with respect to the closed-cross-section portion 102. In the structural member 10*c* shown in FIG. 8C, the flanges 101 form part of the closed-cross-section portion 102. The structural member 10*c* includes a grooved member 13 and a closing plate 2. The grooved member 13 includes a top-surface portion 1*a*, side walls 1*b* extending from the respective ends of the top-surface portion 1*a* to face each other, and flanges 1*c* extending toward each other from those ends of the side walls 1*b* opposite to those on the top-surface portion 1*a*. The flanges 1*c* overlie the closing plate 2. In the arrangement shown in FIG. 8C, the hat member 1 is an example of the first member and the closing plate 2 is an example of the second member.

Figure 9:
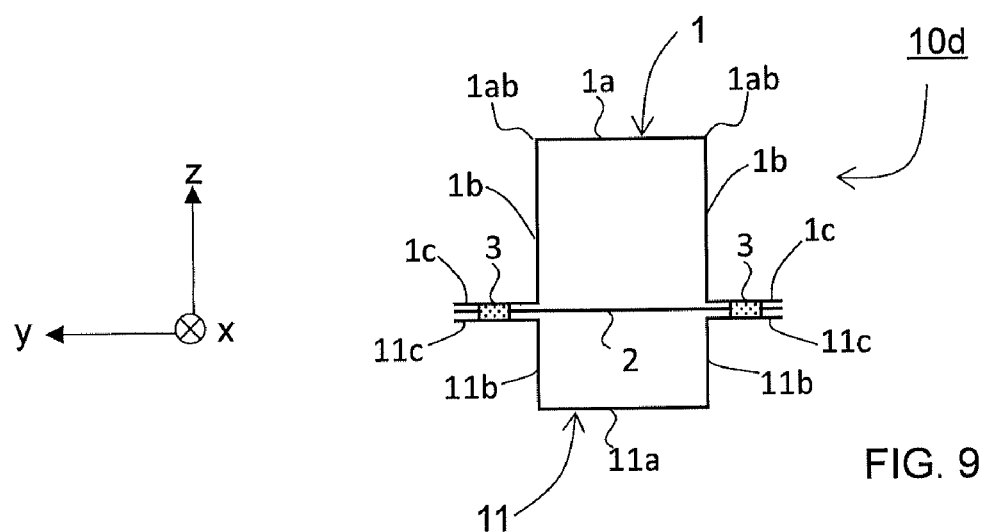
FIG. 9 is a cross-sectional view of a variation of the structural member with yet another cross-sectional shape.

FIG. 9 is a cross-sectional view of an example of the structural member constructed by joining three plates. The structural member 10*d* shown in FIG. 9 is constructed to include the structural member 10 shown in FIG. 1D and another hat member 11 on the side of the closing plate 2 opposite to that with the hat member 1. Similar to the hat member 1, the hat member 11 includes a top-surface portion 11*a*, side walls 11*b* and flanges 11*c*. Three plates, i.e., a flange 1*c* of the hat member 1, the closing plate 2 and a flange 11c of the hat member 11 are placed over one another and are joined by welded portions 3. Thus, the number of plates constituting a structural member is not limited to two. Further, the number of overlying and joined plates is not limited to two. The structural member may be constructed by placing three or more plates over one another and joining them together at welded portions. In the arrangement shown in FIG. 9, at least one of the hat members 1 and 11 may constitute the first member, while the closing plate 2 may constitute the second member.

Figure 10:
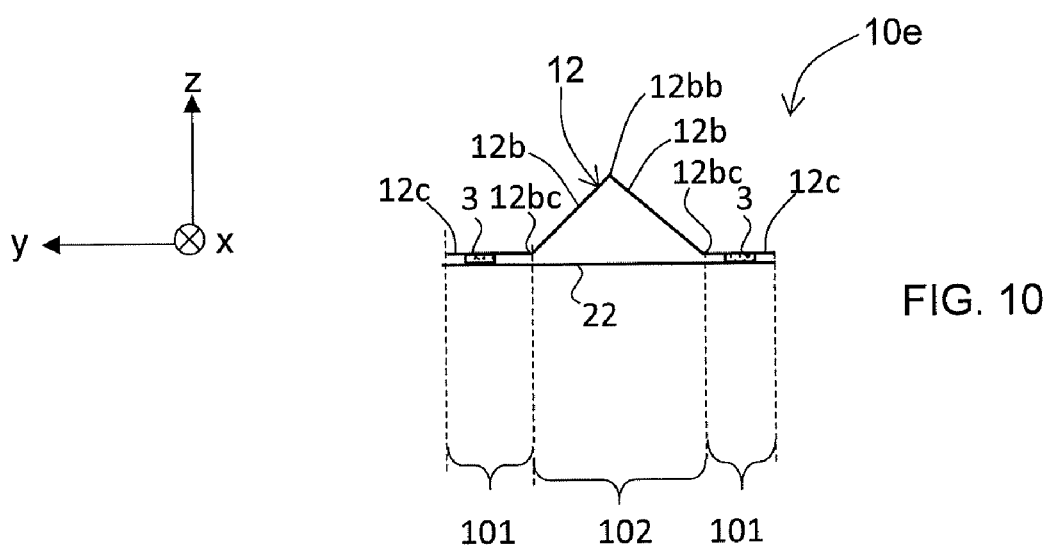
FIG. 10 is a cross-sectional views of a variation of the structural member with still another cross-sectional shape.

FIG. 10 is a cross-sectional view of a structural member according to another variation. The structural member 10e shown in FIG. 10 includes a first plate 12 having three bent portions 12bb and 12bc, and a second plate 22 that has no bent portion and is thus flat. The structural member 10e includes a closed-cross-section portion 102 and plate couplings 101 protruding outwardly from the closed-cross-section portion 102. The first and second plates 12 and 22 are placed to overlie each other at the plate couplings 101 and are coupled by welding. In the arrangement shown in FIG. 10, the first plate 12 may constitute the first member and the second plate 22 may constitute the second member, or, alternatively, the first plate 12 may constitute the second member and the second plate 22 may constitute the first member. Thus, plates constituting part of the closed-cross-section portion are not limited to ones with a top-surface portion 1a, as shown in FIGS. 1A to 1D. Plates having other bent portions may be constitute part of the closed-cross-section portion.

<Variations of Structural Member>

Figure 11A:
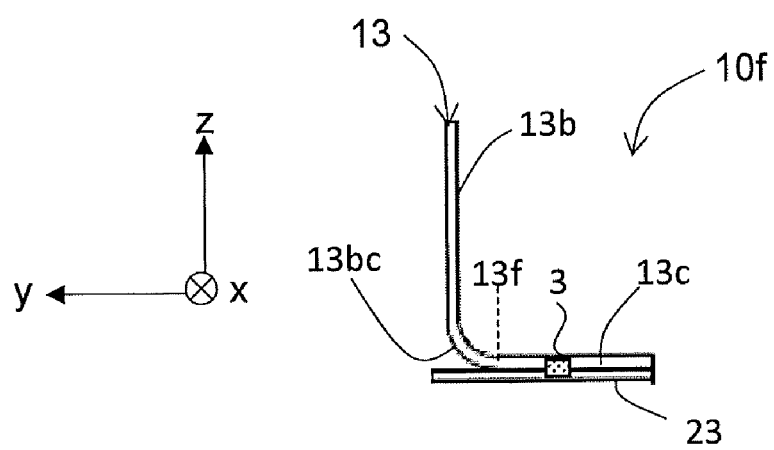
FIG. 11A is a cross-sectional view of a variation of the structural member.
Figure 11B:
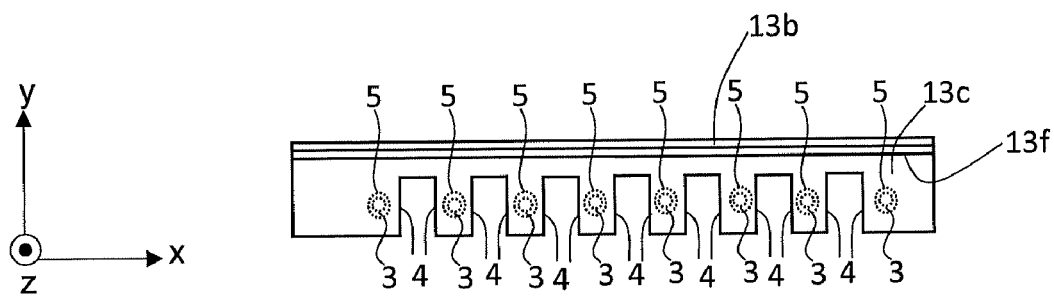
FIG. 11B is a plan view of the structural member of FIG. 11A as viewed in the z-direction.

FIG. 11A is a cross-sectional view of a structural member according to another variation. FIG. 11B is a plan view of the structural member of FIG. 11A as viewed in the z-direction. The structural member 10f of FIGS. 11A and 11B is constructed to have no closed cross section. The structural member 10f includes a first plate 13 having a bent portion 13bc and a second plate 23 having no bent portion. The first plate 13 and second plate 23 overlie each other and assembled by welded portions 3. The tensile strength of the first plate 13 is not lower than 980 MPa.

The first plate 13 includes a plate coupling of the first plate, 13c, and a separated portion of the first plate, 13b. The first-plate coupling 13c is placed over the second plate 23 and joined thereto. The first-plate separated portion 13b extends from an end of the first-plate coupling 13c to form a plane having a predetermined angle (generally right angle in the present implementation) relative to the joined surfaces of the first and second plates 13 and 23. The border between the first-plate coupling 13c and first-plate separated portion 13b represents the bent portion 13bc of the first plate 13.

The first-plate coupling 13c and the second plate 23 are in contact with each other and are joint by the welded portions 3. The welded portions 3 are portions of the first and second plates 13 and 23 welded into one piece, i.e., welded portions. As shown in FIG. 11B, the first-plate coupling 13c and the second plate 23 each include a plurality of welded portions 3 (or spot welds). A heat-affected zone 5 is present around each of the welded portions 3 of the first-plate coupling 13c. A pair of edge sections 4 of the first-plate coupling 13c are provided between adjacent heat-affected zones 5. The pair of edge sections 4 of the first-plate coupling 13c form a discontinuity between adjacent heat-affected zones 5.

The plurality of welded portions 3 and heat-affected zones 5 are arranged in the direction in which the ridge of the bent portion 13bc extends (i.e., x-direction). Each pair of edge sections 4 of the first-plate coupling 13c form part of a slit (or cut) extending toward the bent portion 13bc, beginning at the edge of the first-plate coupling 13c opposite to the edge on the bent portion 13bc. The slit does not extend all the way to the bent portion 13bc. Specifically, the slit is formed not to overlap the bent portion between the first-plate coupling 13c and first-plate separated portion 13b as viewed in the z-direction. That is, the edge section connecting the pair of edge sections 4 of the first-plate coupling 13c between adjacent heat-affected zones is positioned not to intersect that edge 13f of the round portion of the bent portion 13bc which is adjacent to the first-plate coupling 13c.

Thus, the structural member may not be constructed to have a closed cross section. Further, the structural member may be formed by plates that have no bent portion. For example, starting from the arrangement shown in FIG. 11A, the first plate 13 may be replaced by a flat plate having no bent portion. In such implementations, the welded portions 3 and the pairs of edge sections 4 may be arranged in a similar manner to FIG. 11B, for example. In the arrangement shown in FIGS. 11A and 11B, the first plate 13 may constitute the first member and the second plate 23 may constitute the second member, or, alternatively, the first plate 13 may constitute the second member and the second plate 23 may constitute the first member.

Figure 12:
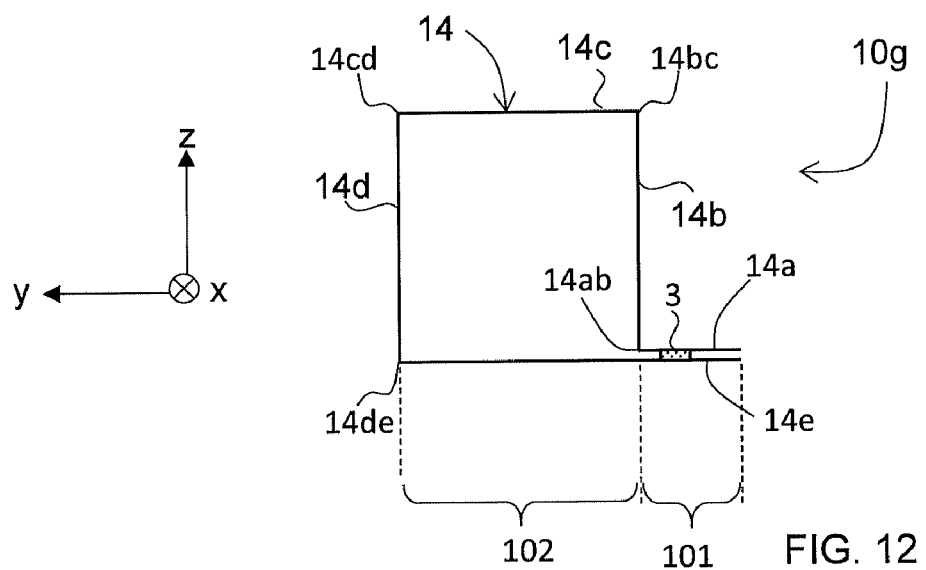
FIG. 12 is a cross-sectional view of a variation of the structural member with another cross-sectional shape.

FIG. 12 is a cross-sectional view of a structural member according to yet another variation. The structural member 10g shown in FIG. 12 is constructed by bending a single plate 14 to form a tubular portion (i.e., closed-cross-section portion 102).

The single plate 14 constituting the structural member 10g includes a first plate portion 14a and a second plate portion 14e that overlie each other and are joined to each other. The first and second plate portions 14a and 14e are portions including edges of the single plate 14. The overlying first and second plate portions 14a and 14e are contiguous to the closed-cross-section portion 102, forming a flange 101 positioned outward with respect to the closed-cross-section portion 102. That is, in the implementation shown in FIG. 12, the closed-cross-section portion 102 and flange 101 are constituted by a single plate 14.

The first and second plate portions 14a and 14e are joined to each other by welded portions 3. Although not shown in FIG. 12, a plurality of welded portions 3 are provided. A heat-affected zone is formed around each of the welded portions 3 of the first and second plate portions 14a and 14e. A pair of edge sections of the first plate portion 14a are provided between adjacent heat-affected zones of the first plate portion 14a. A pair of edge sections of the second plate portion 14e are provided between adjacent heat-affected zones of the second plate portion 14e. In the first and second plate portions 14a and 14e, the welded portions 3, heat-affected zones and pairs of edge sections may have the same constructions as in the first members in FIGS. 1B, 1C and 2 to 6, for example.

The plate 14 includes a plurality of bent portions 14ab, 14bc, 14cd and 14de located between the first and second plate portions 14a and 14e. The ridges formed by these bent portions 14ab, 14bc, 14cd and 14de extend in the x-direction. Although not shown, the x-direction may be the longitudinal direction of the structural member 10g. In such implementations, the structural member 10g includes a tubular portion extending in the x-direction. Further, a plurality of welded portions 3 are arranged in the direction in which the ridges of the bent portions 14ab, 14bc, 14cd and 14de extend. The edge section connecting a pair of edge sections provided between adjacent heat-affected zones of the first plate portion 14*a* are formed not to extend all the way to the bent portion 14*ab*.

Alternatively, the shape of a closed cross section of the structural member is not limited to a square, but may be other polygons or shapes including curves. Further, while in the implementation shown in FIG. 12, the flange 101 including overlying plate portions is located outward with respect to the closed-cross-section portion 102, the overlying plate portions may be provided inside the closed-cross-section portion 102, as shown in FIGS. 13 and 14.

Figure 13:
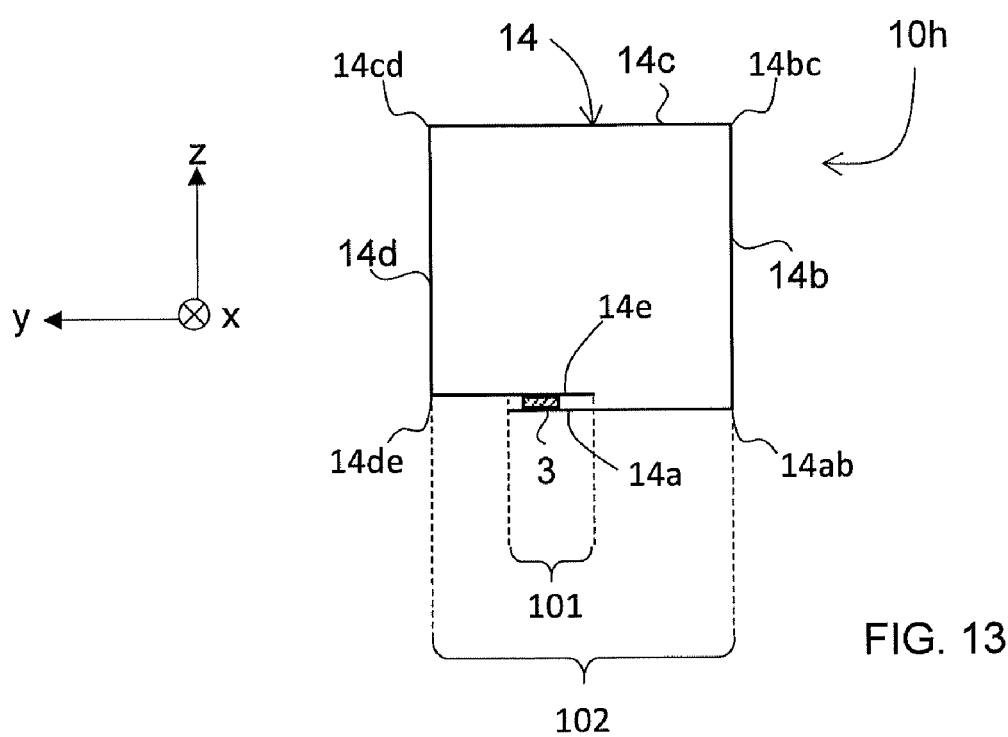
FIG. 13 is a cross-sectional view of a variation of the structural member with yet another cross-sectional shape.
Figure 14:
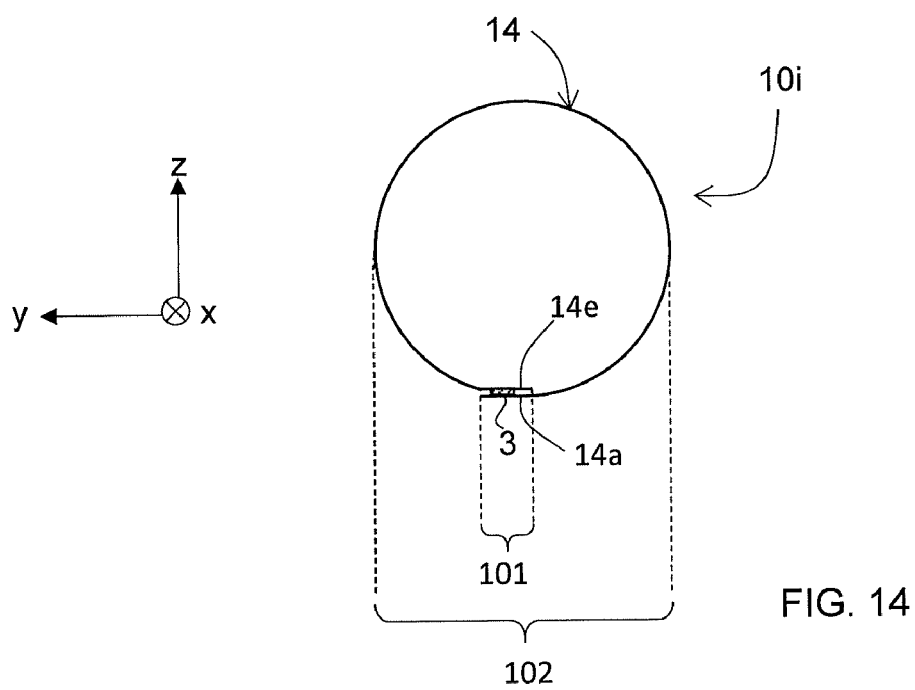
FIG. 14 shows an exemplary arrangement with a closed-cross-section portion with a circular closed cross section formed by one plate.

In the structural member 10*h* shown in FIG. 13, the closed-cross-section portion 102 includes overlying plate portions 14*a* and 14*e*. The overlying plate portions 14*a* and 14*e* are joined by welded portions 3. Although not shown in FIG. 13, a plurality of welded portions 3 are arranged in the x-direction. A heat-affected zone is present in each of the plate portions 14*a* and 14*e* to surround each of the plurality of welded portions 3. In each of the plate portions 14*a* and 14*e*, a pair of edge sections are provided between adjacent heat-affected zones. The pair of edge sections may have the same construction as in FIGS. 1B, 1C and 2 to 6, for example. The edge section connecting the edge sections of each pair in the plate portions 14*a* and 14*e* does not extend all the way to the bent portions 14*ab* and 14*de*, respectively, of the plate 14.

The shape of a closed cross section of the closed-cross-section portion formed by a single plate 14 is not limited to a rectangle. For example, a closed-cross-section portion having a closed cross section with any other shape, such as a polygon, a circle, an ellipse, may be formed by a signal plate 14. FIG. 14 shows an exemplary arrangement with a closed-cross-section portion 102 having a circular closed cross section formed by a single plate 14.

<Welding Portions>

The welding for forming the welded portions is not limited to spot welding. For example, welded portions may be formed by laser-based welding or arc welding. Regardless of whether arc welding or laser-based welding is used, a heat-affected zone may be formed around each welded portion if the tensile strength of the first member is not lower than 980 MPa. In such implementations, as with the above-illustrated embodiments, it is preferable that a pair of edge sections of the first member be provided between adjacent heat-affected zones of the first member. This prevents a break originating from an initiation point represented by a heat-affected zone.

Figure 15:
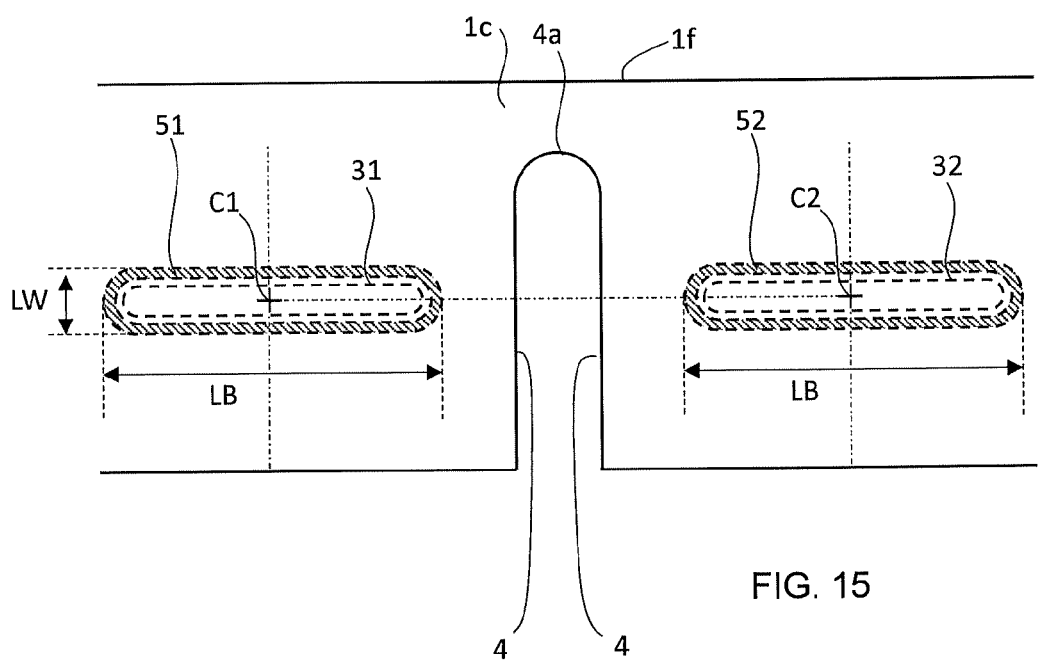
FIG. 15 shows exemplary welded portions obtained by arc welding.

FIG. 15 shows exemplary welded portions obtained by arc welding. In the implementation shown in FIG. 15, welded portions 31 and 32 created by arc welding are surrounded by heat-affected zones 51 and 52, respectively. A pair of edge sections 4 of the first member 1*c* are provided between the adjacent heat-affected zones 51 and 52. The longitudinal direction LB is defined as the longitudinal direction of a welding portion created by arc welding, and the width direction LW is defined as the direction perpendicular to the longitudinal direction. Each of the centers C1 and C2 of the welded portions 31 and 32 is defined as the midpoint of a longitudinal line that equally divides the associated one of the welded portions 31 and 32 into two parts. In the implementation shown in FIG. 15, a pair of edge sections 4 are provided to cross the line linking the centers of the welded portions 31 and 32. The edge section 4*a* connecting the pair of edge sections 4 does not interrupt the ridge if of the first member.

<Other Variations>

The joined surfaces of steel sheets joined by welded portions may be curved. The structural member may be curved in a direction perpendicular to the joined surfaces of the steel sheets (or sheet portions) or in a direction parallel to the joined surfaces (i.e. in an in-plane direction), for example. In implementations where the structural member is constituted by a plate including a bent portion, the ridge formed by the bent portion may be straight or curved in shape.

In one exemplary implementation where a plurality of welded portions are arranged in the direction in which the ridge of the bent portion extends, at least some of the plurality of welded portions may be displaced as determined along a direction perpendicular to the ridge. In some implementations, the plurality of welded portions may be arranged in a direction perpendicular to the direction in which the ridge of the bent portion extends.

[Results of Simulations]

The inventors conducted simulations using models of the structural member including a hat member and a closing plate to analyze the deformation behavior of the structural member upon application of an impact. They used a plurality of models with different constructions of the edge sections of the flange in the structural member. The simulations involved an impacter hitting the hat member 1 in the z-direction.

Figure 16:
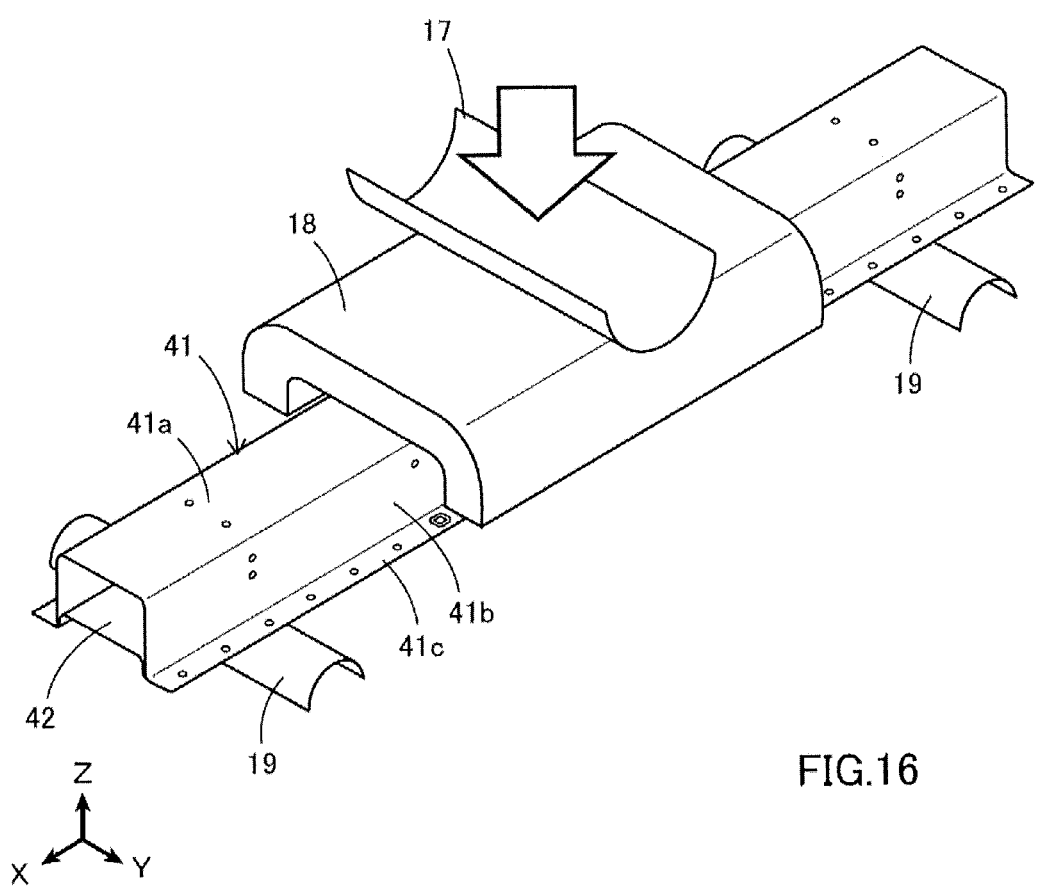
FIG. 16 illustrates a model for simulations.
Figure 17:
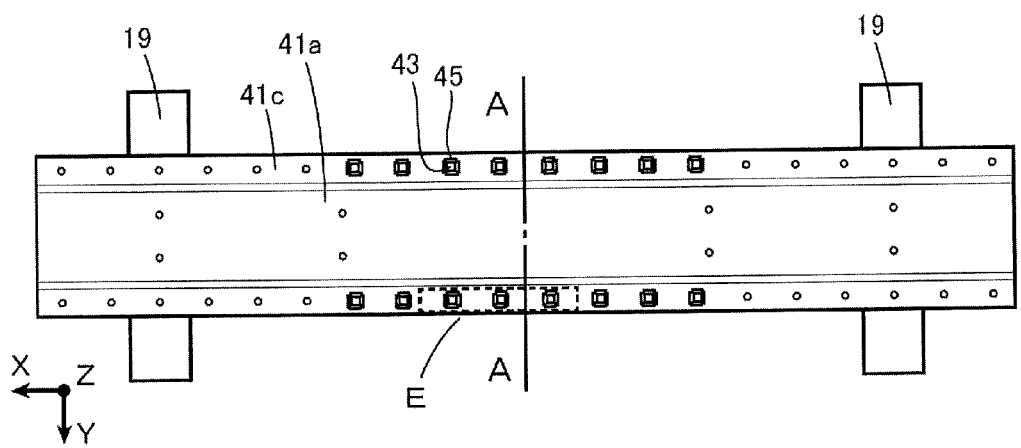
FIG. 17 shows the model structural member of FIG. 16 as viewed in the z-direction.
Figure 18:
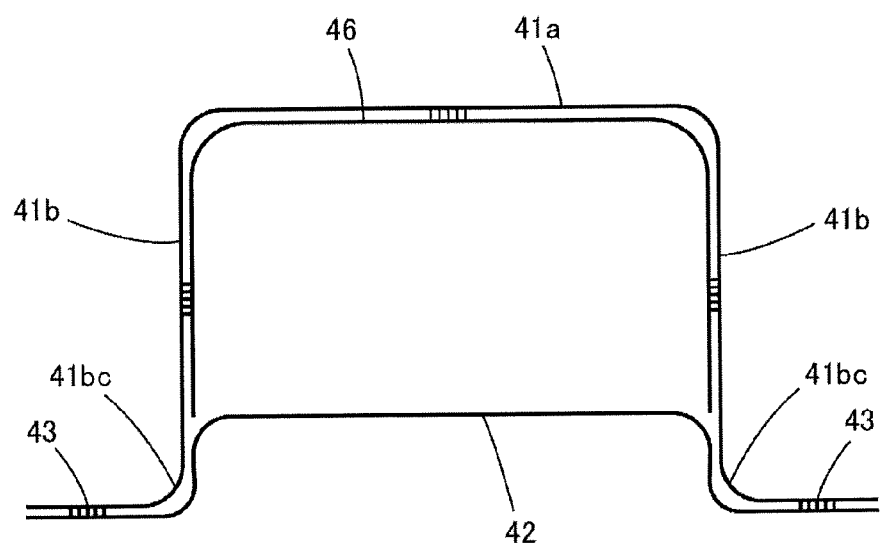
FIG. 18 is a cross-sectional view of the member of FIG. 17 taken along line A-A.
Figure 19:
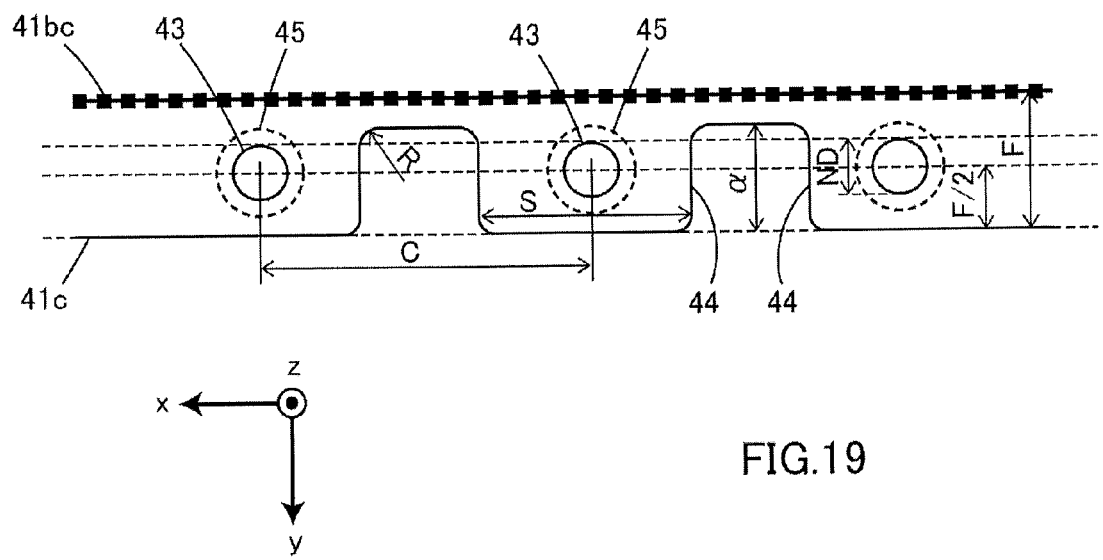
FIG. 19 is an enlarged view of area E of FIG. 17.

FIG. 16 shows a model used for the simulations. FIG. 17 shows the structural member of the model of FIG. 16 as viewed from above (i.e., in the z-direction). FIG. 18 is a cross-sectional view taken on line A-A shown in FIG. 17. FIG. 19 is an enlarged view of area E of FIG. 17.

In the model shown in FIG. 16, the impacter 17 is caused to hit the structural member including the hat member 41 and closing plate 42 from above. The structural member is placed on stands 19 arranged in the longitudinal direction of the hat member 41. A cover 18 is placed over a central portion of the hat member 41, between the stands 19. The hat member 41 includes a top-surface portion 41*a*, side walls 41*b* and flanges 41*c*. The flanges 41*c* are placed over the closing plate 42 and joined thereto by spot welding. The cover 18 is in contact with the top-surface portion 18. The impacter 17 advances in the z-direction and hits the cover 18.

As shown in FIG. 17, a plurality of welded portions 43 created by spot welding are arranged in the same direction in which the ridges 41*bc* between the flanges 41*c* and side walls 41*b* extend (i.e., x-direction). Each of the plurality of welded portions 43 is surrounded by a heat-affected zone 45. The strength of the heat-affected zones 45 is set to a lower value than the strength of the base material of the hat member.

As shown in FIG. 18, a reinforcing member 46 is provided in contact with the hat member 41, located within the space surrounded by the hat member 41 and closing plate 42. The reinforcing member 46 is joined to the side walls 41*b* of the hat member 41 and top-surface portion 41*a* by welding. The closing plate 42 is bent so as to follow the bent portions between the flanges 41*c* and side walls 41*b* of the hat member 41. The metal plates of the hat member 41 and closing plate 42 of FIG. 17 have a tensile strength of 1470 MPa and a plate thickness of 1.4 mm. The metal plate of the reinforcing member 46 has a tensile strength of 1470 MPa and a plate thickness of 2.0 mm.

As shown in FIG. 19, cuts are provided in a flange 41*c*. That is, a pair of edge sections 44 of the flange 41*c* are positioned between adjacent heat-affected zones 45. The edge sections 44 extend in the y-direction. The pair of edge sections 44 of the flange 41*c* between adjacent heat-affected zones 45 constitute part of a cut. Simulation parameters include the diameter ND of a welded portion 43, the distance C between the centers of welded portions 43, the distances between those edge sections 44 of the flange 41c which sandwich a welded portion 43 as measured in the x-direction, the dimension α of a cut in the y-direction, i.e., the depth a of a cut, the dimension F of the flange 41c in the y-direction, and the radius of curvature R of a corner of a cut. The radius of curvature R is the radius of curvature of the locus of the edge section linking a pair of edge sections 44.

Figure 20A:
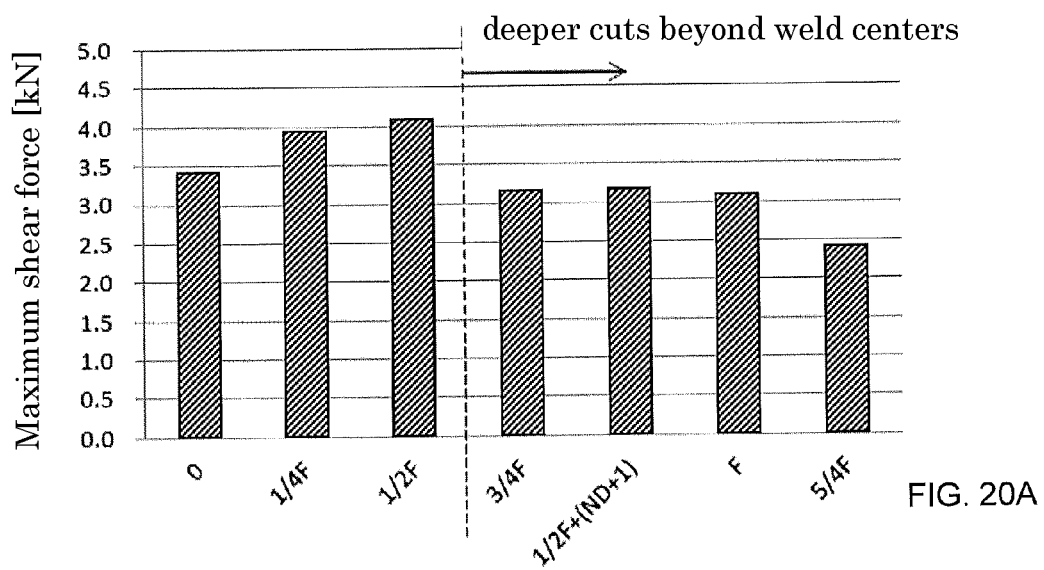
FIG. 20A is a graph showing the results of analysis for different y-dimensions α of the notches.
Figure 20B:
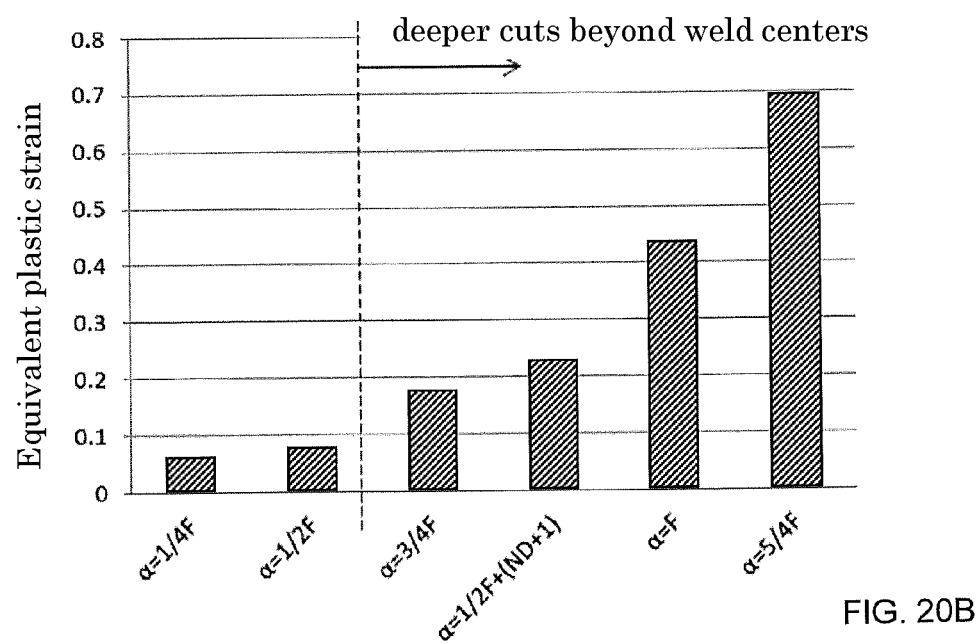
FIG. 20B is a graph showing the results of analysis with different dimensions α.
Figure 20C:
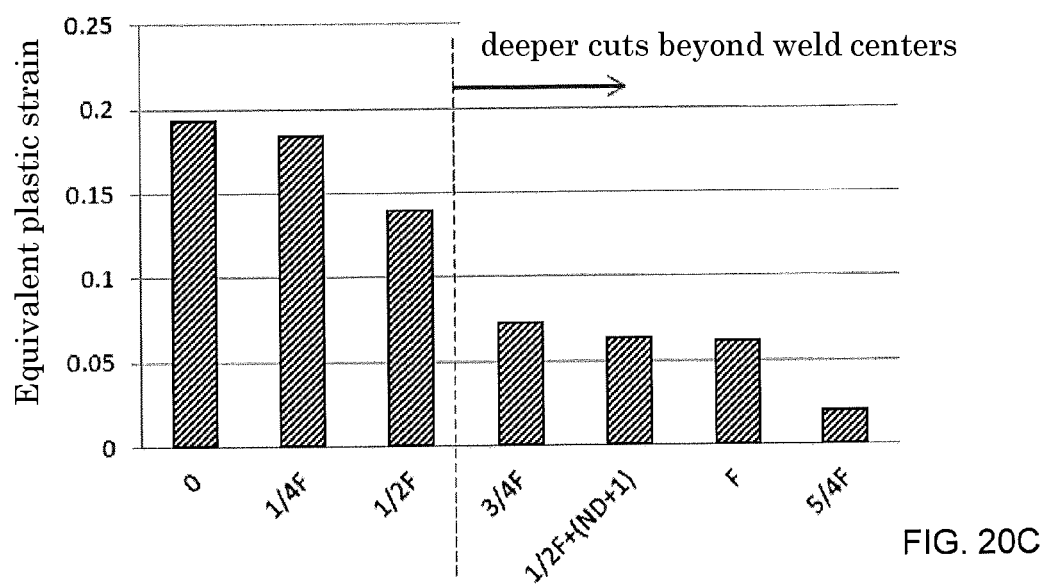
FIG. 20C is a graph showing the results of analysis with different dimensions α.

FIGS. 20A to 20C are graphs showing the results of simulations upon an impacter hit, where the dimension α of a cut in the y-direction were varied. These graphs show calculated values for $\alpha=0$, $\alpha=(\frac{1}{4})F$, $\alpha=(\frac{1}{2})F$, $\alpha=(\frac{3}{4})F$, $\alpha=(\frac{1}{2})F+(ND+1)$, $\alpha=F$, and $\alpha=(\frac{5}{4})F$. FIG. 20A shows the maximum shear force until the impacter maximum load stroke was reached. FIG. 20B shows the equivalent plastic strain at a position of deformation concentration. FIG. 20C shows the equivalent plastic strain at a heat-affected zone.

From the results shown in FIG. 20A, it was found that the burden on a welded portion decreases when the dimension α of a cut in the y-direction is larger than the distance between the center of the welded portion 43 and the edge of the flange 41c as measured in the y-direction ($\alpha>(\frac{1}{2})F$). From the results shown in FIG. 20B, it was found that the larger the depth of a cut, the less the burden on a heat-affected zone. Particularly, the burden on a heat-affected zone is significantly smaller if the dimension a of a cut in the y-direction is larger than the distance between the center of a welded portion 43 and the edge of the flange 41c as measured in the y-direction ($\alpha>(\frac{1}{2})F$). From the results shown in FIG. 20C, it was found that the larger the cut depth, the larger the deformation concentration on the flange.

Figure 21A:
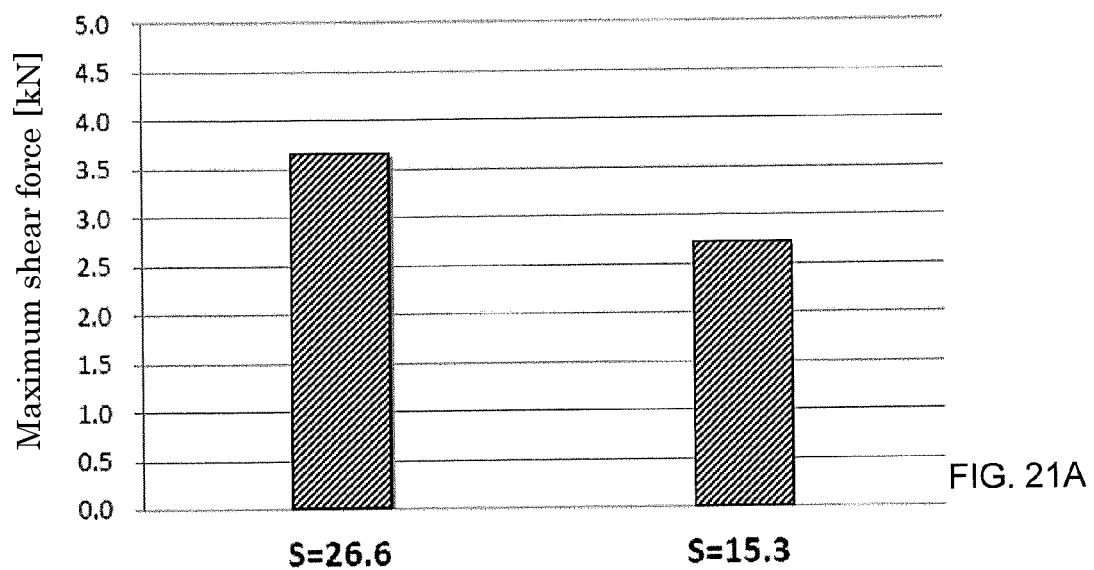
FIG. 21A is a graph showing the results of analysis with different x-distances S between the edge sections 4 sandwiching a welded portion.
Figure 21B:
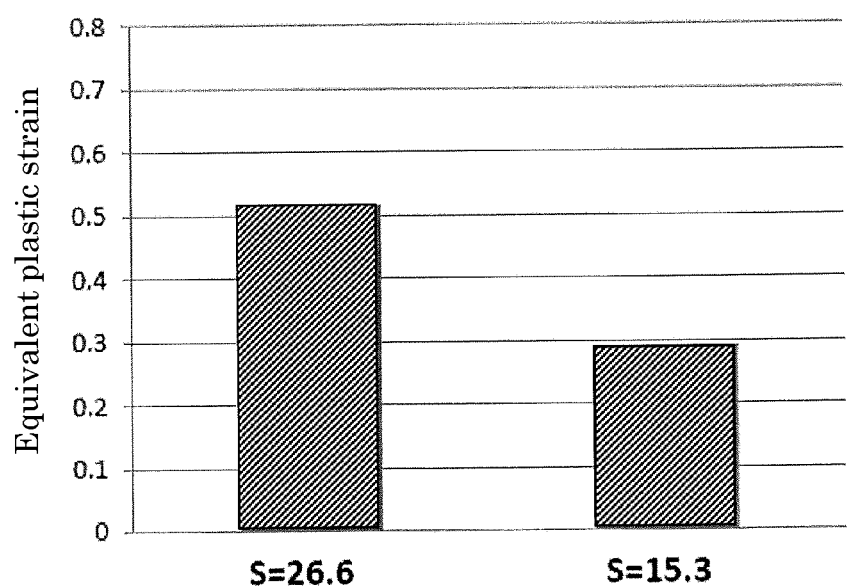
FIG. 21B is a graph showing the results of analysis with different distances S.
Figure 21C:
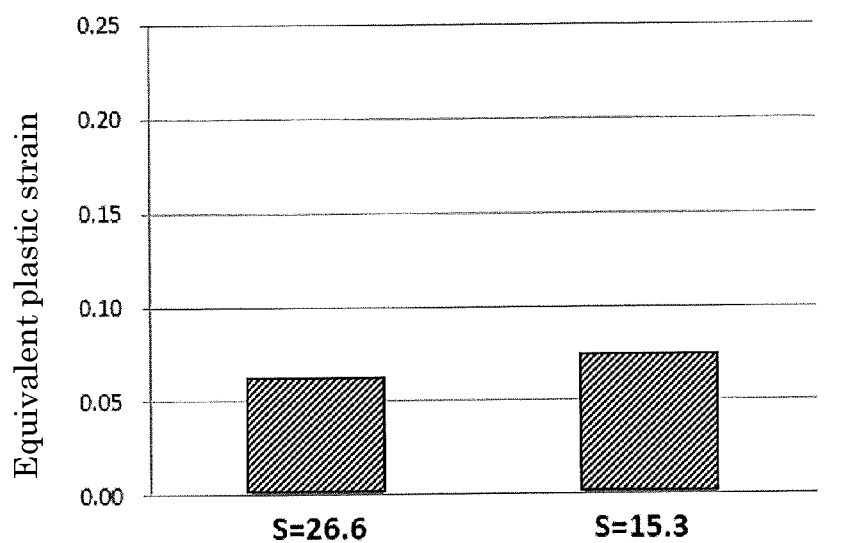
FIG. 21C is a graph showing the results of analysis with different distances S.

FIGS. 21A to 21C are graphs showing the results of simulations upon an impacter hit, where the distance S between the edge sections 44 sandwiching a welding portion 43 as measured in the x-direction was varied. These graphs show calculated values for S=26.6 mm and S=15.3 mm. FIG. 21A shows the maximum shear force until the impacter maximum load stroke was reached. FIG. 21B shows the equivalent plastic strain at a position of deformation concentration. FIG. 21C shows the equivalent plastic strain at a heat-affected zone.

From the results shown in FIG. 21A, it was found that the larger the distance S, the larger the burden on a welded portion. From the results shown in FIG. 21B, it was found that the larger the distance S, the larger the deformation concentration on the flange. From the results shown in FIG. 21C, it was found that the effect of the distance S on the burden on a on heat-affected zone is negligible.

Figure 22A:
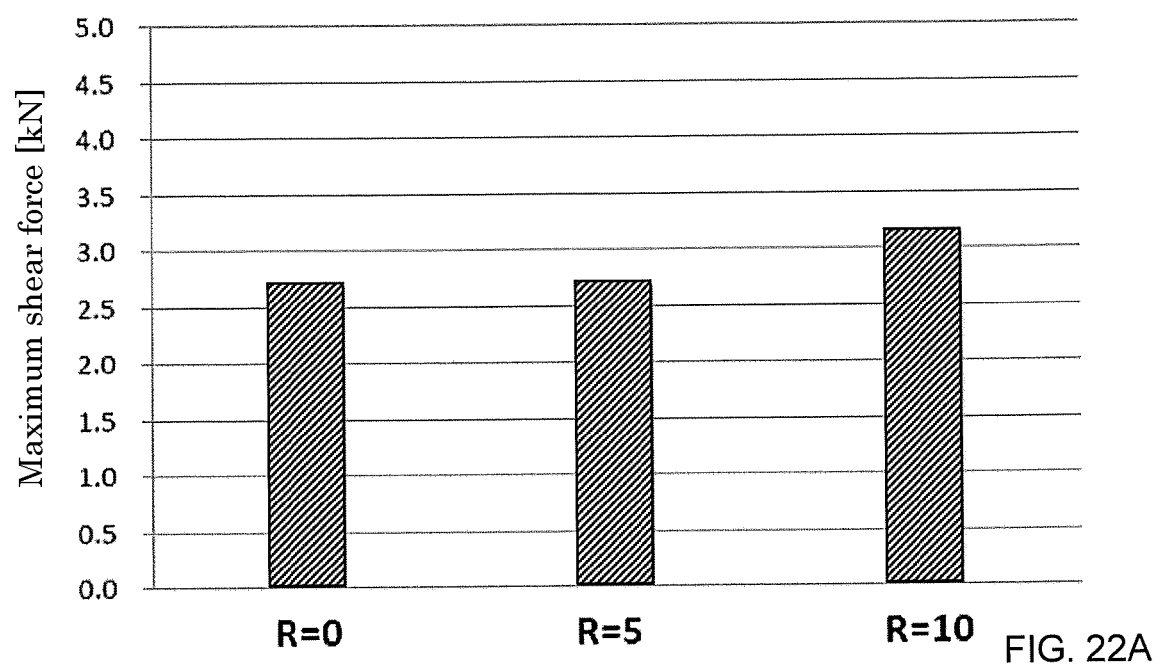
FIG. 22A is a graph showing the results of analysis with different radii of curvature R of the corners of the notches.
Figure 22B:
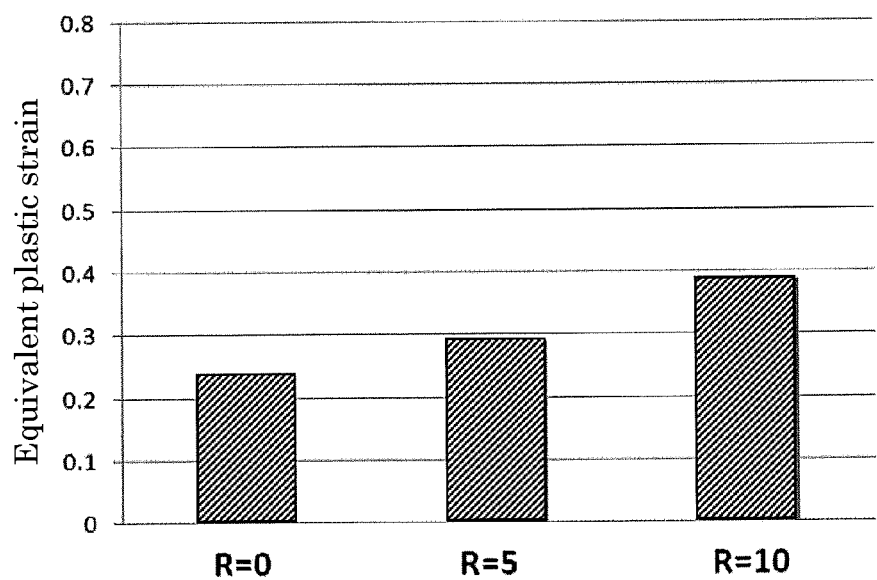
FIG. 22B is a graph showing the results of analysis with different radii of curvature R.
Figure 22C:
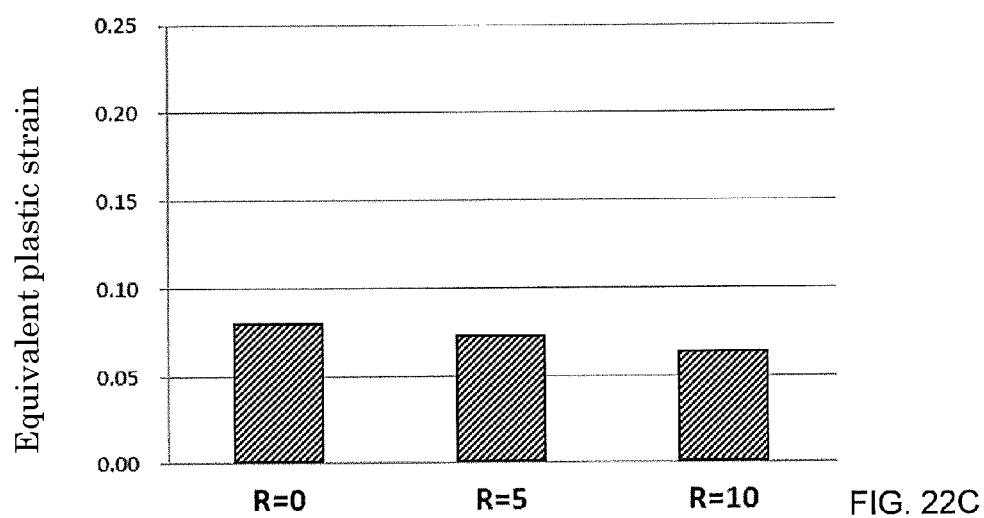
FIG. 22C is a graph showing the results of analysis with different radii of curvature R.

FIGS. 22A to 22C are graphs showing the results of simulations upon an impacter hit, where the radius of curvature R of a corner of a cut was varied. These graphs show the calculated values for R=0, R=5 mm and R=10 mm. FIG. 22A shows the maximum shear force until the impacter maximum load stroke was reached. FIG. 22B shows the equivalent plastic strain at a position of deformation concentration. FIG. 22C shows the equivalent plastic strain at a heat-affected zone.

From the results shown in FIG. 22A, it was found that the effect of the radius of curvature R of a corner of a cut on a welded portion is negligible. From the results shown in FIG. 22B, it was found that the larger the radius of curvature R of a corner of a cut, the larger the deformation concentration on the flange. From the results shown in FIG. 22C, it was found that the effect of the radius of curvature R of a corner of a cut on the burden on a heat-affected zone is negligible.

The above-described structural member can be suitably used for structural-member applications where the member may deform or fracture. Particularly, if the present invention is applied to a structural member that may deform or fracture, the welded portions are less likely to break, thus providing a structural member that cannot easily be fractured. Examples of the structural member that can deform or fracture include structural members for vehicles. Specific examples of structural members for vehicles include frame-type parts of automobile structures, such as front frames, rear frames, side sills, front pillars, center pillars, crossmembers, side rails, tunnels, bumper reinforcements, and other various reinforcements (reinforcing members). Further, the present invention may be applied to panel-type parts of automobile structures, such as side panels, fenders, dash panels, floor panels, and center panels. When an automobile crashes, such automobile structures is deformed or fractured, and the present invention exhibits its effects.

If the structural member of the present invention is to be used as a structural member for a vehicle, the structural member may be positioned, for example, such that the direction in which the welded portions of the structural member are arranged or the bent portions extend extends along the outer shape of the vehicle. That is, the structural member may be positioned such that the direction in which the welded portions of the structural member are arranged or the bent portions extend is generally orthogonal to an impact from outside the vehicle. Thus, when the structural member receives an impact from outside the vehicle, the welded portions are less likely to break. Accordingly, implementations where the above-illustrated structural member is used as a structural member for a vehicle, as well as a vehicle including the above-illustrated structural member, are encompassed by embodiments of the present invention.

Further, in the structural member of the present invention, a plurality of pairs of adjacent welded portions may be present. That is, a plurality of pairs of adjacent heat-affected zones of the first member may be present. In such implementations, a pair of edge sections of the first member is provided between the adjacent heat-affected zones of at least one of the plurality of pairs of heat-affected zones. Further, the material of the second member is not limited to steel. For example, the material of the second member may be steel, aluminum or other metals.

Although embodiments of the present invention have been described, the above-illustrated embodiments are merely examples for carrying out the present invention. Thus, the present invention is not limited to the above-illustrated embodiments, and the above-illustrated embodiments, when carried out, may be modified as appropriate without departing from the spirit of the invention.

EXPLANATION OF CHARACTERS

1: hat member (first plate)
2: closing plate (second plate)
3, 31, 32: welded portions
5, 51, 52: heat-affected zones
10, 10a, 10b, 10c: structural member
1a: top-surface portion
1b: side walls
1c: flanges 1ab, 1bc: bent portions

The invention claimed is:
1. A structural member comprising:
a first member, the first member being a steel sheet with a tensile strength of 980 MPa or higher;

a second member overlying the first plate, the second member being a metal plate;

a plurality of welded portions joining the first member and the second member by welding;

a plurality of heat-affected zones formed in the first member, each of the heat-affected zones surrounding a corresponding one of the plurality of welded portions, the heat-affected zones having a Vickers hardness lower than that of the first member by 50 HV or more; and a pair of edge sections of the first member located between adjacent heat-affected zones and extending in a direction crossing a line linking the adjacent welded portions.

2. The structural member according to claim 1, wherein the pair of edge sections cross a line linking centers of the adjacent welded portions.

3. The structural member according to claim 2, wherein the pair of edge sections cross an edge of an area defined between inner peripheries of the adjacent heat-affected zones.

4. The structural member according to claim 3, wherein the pair of edge sections traverse an area defined between the adjacent heat-affected zones.

5. The structural member according to claim 1, wherein the pair of edge sections are an edge of a hole formed in the first member.

6. The structural member according to claim 1, wherein:
the second member has a tensile strength lower than 1180 MPa; and
no edge section is provided for the second member between the adjacent welded portions.

7. The structural member according to claim 1, wherein:
the second member is a steel sheet with a tensile strength of 980 MPa or higher; and
the structural member further comprises a pair of edge sections of the second member located between adjacent heat-affected zones and extending in a direction crossing a line linking the adjacent welded portions.

8. The structural member according to claim 1, wherein, in the second member and around the plurality of welded portions, no heat-affected zones with a Vickers hardness lower than that of the second member by 50 HV or more are provided.

9. The structural member according to claim 1, wherein a distance between those ones of the edge sections sandwiching the welded portions which are closer to each of the welded portions is six times a diameter of the welded portions or smaller.

10. The structural member according to claim 1, wherein a radius of curvature of an edge section linking the pair of edge sections is 10 mm or smaller.

11. The structural member according to claim 1, wherein the first member includes a ridge, and the pair of edge sections and an edge section connecting to the pair of edge sections do not interrupt the ridge.

* * * * *